US011940554B2

(12) United States Patent
Roger et al.

(10) Patent No.: US 11,940,554 B2
(45) Date of Patent: Mar. 26, 2024

(54) AUTOMOTIVE RADAR ARRANGEMENT AND METHOD FOR OBJECT DETECTION BY VEHICLE RADAR

(71) Applicant: Infineon Technologies AG, Neubiberg (DE)

(72) Inventors: Andre Roger, Munich (DE); Simon Achatz, Munich (DE); Dian Tresna Nugraha, Bandung (ID)

(73) Assignee: Infineon Technologies AG, Neubiberg (DE)

( * ) Notice: Subject to any disclaimer, the term of this patent is extended or adjusted under 35 U.S.C. 154(b) by 395 days.

(21) Appl. No.: 17/346,458

(22) Filed: Jun. 14, 2021

(65) Prior Publication Data

US 2021/0389420 A1    Dec. 16, 2021

(30) Foreign Application Priority Data

Jun. 15, 2020   (DE) ..................... 10 2020 115 709.6

(51) Int. Cl.
*G01S 7/40*         (2006.01)
*G01S 13/34*        (2006.01)
(Continued)

(52) U.S. Cl.
CPC ............ *G01S 7/4008* (2013.01); *G01S 13/34* (2013.01); *G01S 13/46* (2013.01); *G01S 13/58* (2013.01)

(58) Field of Classification Search
CPC ...... G01S 13/931; G01S 13/343; G01S 13/87; G01S 7/356; G01S 7/354; G01S 13/42;
(Continued)

(56) References Cited

U.S. PATENT DOCUMENTS

2015/0070207 A1* 3/2015 Millar ................ G01S 13/4454
                                                          342/174
2017/0045609 A1   2/2017 Loesch
(Continued)

FOREIGN PATENT DOCUMENTS

DE   1020118217110 A1   4/2020

OTHER PUBLICATIONS

Texas Instruments Incorporated; "Design Guide: TIDEP-01012 Imaging Radar Using Cascaded mmWave Sensor Reference Design"; Jul. 25, 2019.
(Continued)

*Primary Examiner* — Bernarr E Gregory
*Assistant Examiner* — Juliana Cross
(74) *Attorney, Agent, or Firm* — Eschweiler & Potashnik, LLC

(57) ABSTRACT

An automotive radar arrangement includes a radar receiver configured to generate radar reception data from radio signals received by a plurality of radar receive antennas. A radar signal processor is configured to determine an estimate of an angular position of at least one object by processing the radar reception data. A communication interface is configured to receive information about a reference angular position of the at least one object. A determiner is configured to determine a compensation for the radar reception data based on the estimate of the angular position and the reference angular position of the at least one object. The radar signal processor is configured to correct the radar reception data and/or further radar reception data for the detection of a further object based on the compensation. An output interface is configured to provide information about the presence of the further object to a vehicle controller.

18 Claims, 23 Drawing Sheets

(51) Int. Cl.
*G01S 13/46* (2006.01)
*G01S 13/58* (2006.01)

(58) Field of Classification Search
CPC ........... G01S 2013/93271; G01S 7/352; G01S 2013/9316
See application file for complete search history.

(56) References Cited

U.S. PATENT DOCUMENTS

2018/0292510 A1   10/2018  Rao
2021/0374432 A1*  12/2021  Kaku ................ B60W 50/0205
2022/0373645 A1*  11/2022  Travnikar ............. G01S 13/867

OTHER PUBLICATIONS

Exas Instruments Incorporated; "AWR1243 sensor: Highly intergrated 76-81-GHz radar front-end for emerging ADAS applications"; May 3, 2017.

* cited by examiner

FIG 10
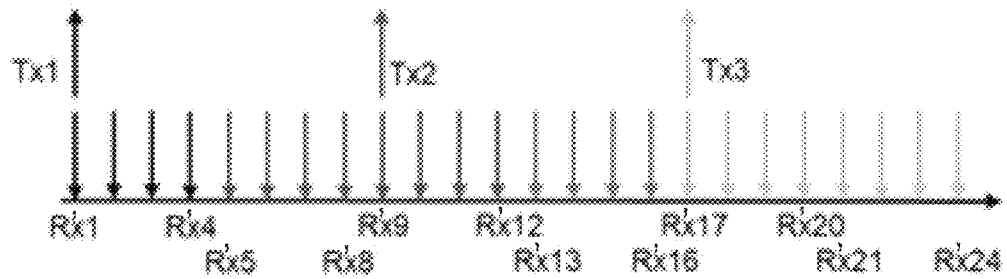
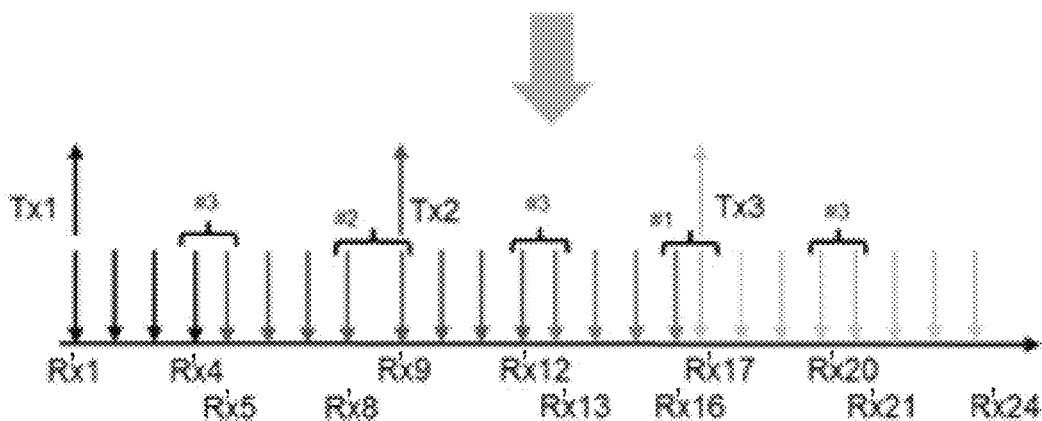

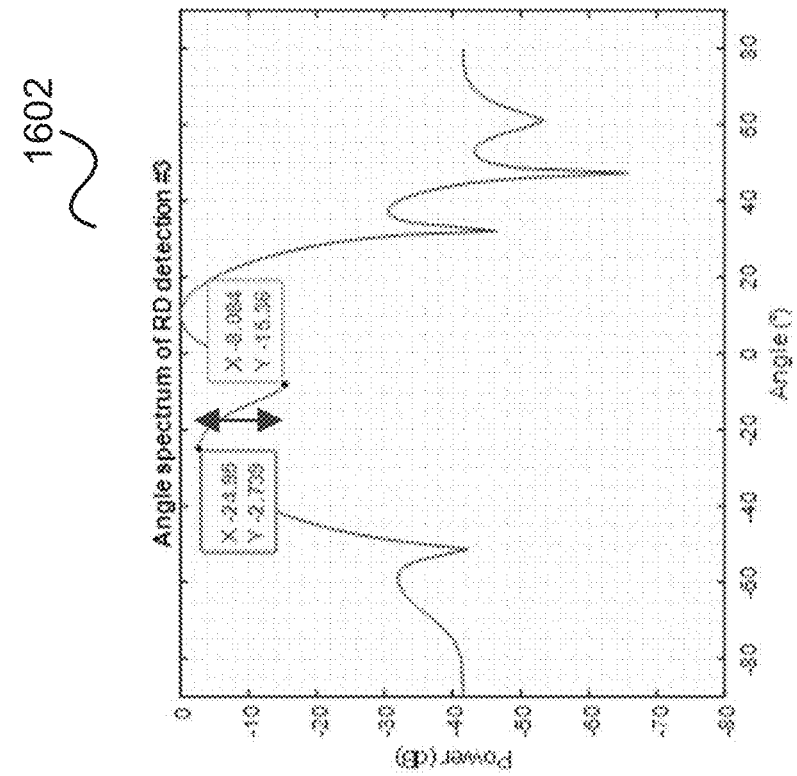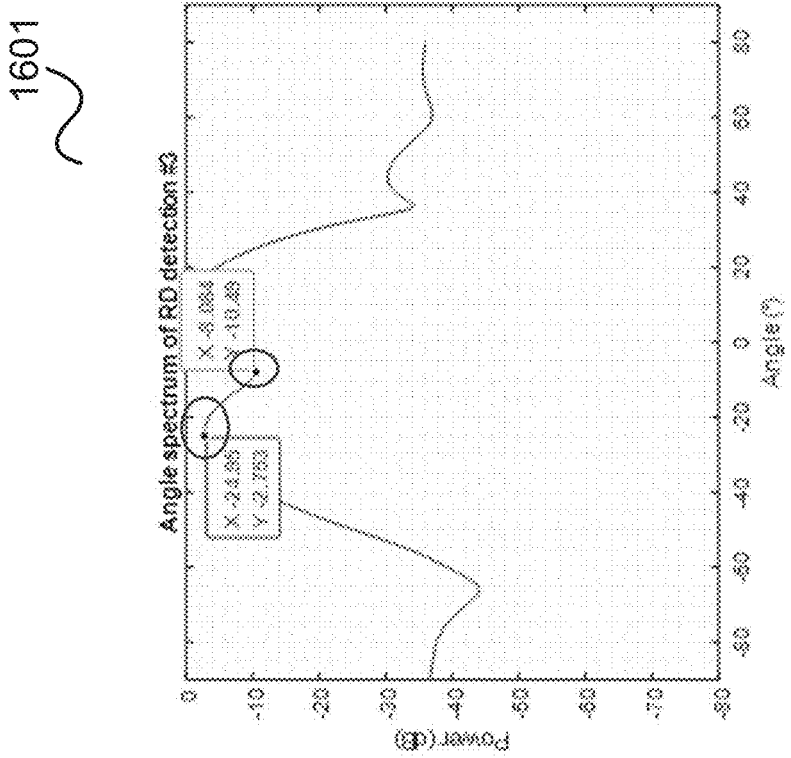
FIG 16

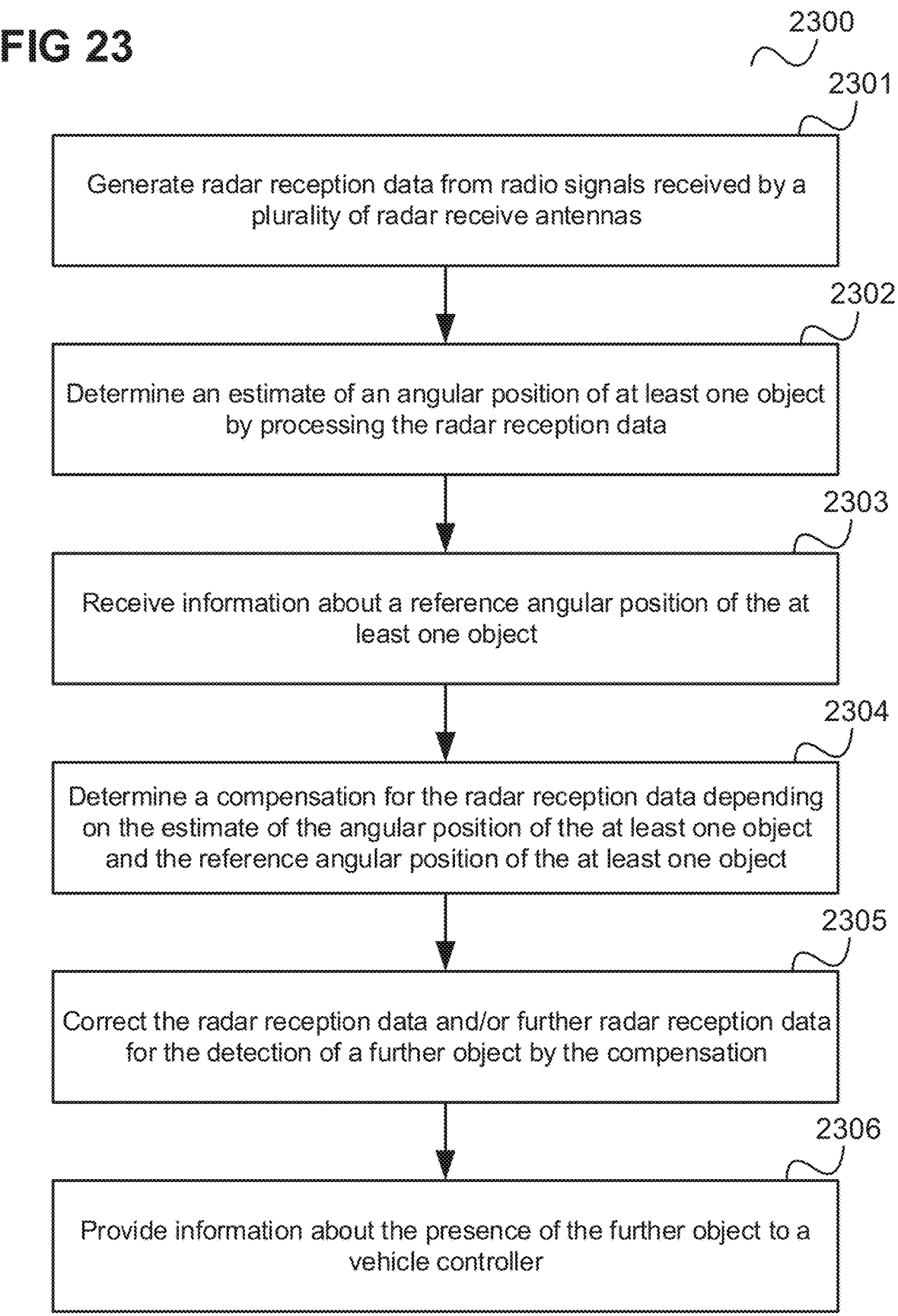

AUTOMOTIVE RADAR ARRANGEMENT AND METHOD FOR OBJECT DETECTION BY VEHICLE RADAR

REFERENCE TO RELATED APPLICATION

This application claims priority to German Application No. 10 2020 115 709.6, filed on Jun. 15, 2020, the contents of which are hereby incorporated by reference in their entirety.

TECHNICAL FIELD

The present disclosure relates to automotive radar arrangements and methods for object detection by vehicle radar.

BACKGROUND

For the determination of direction of arrival of radar using echo signals in a radar receiver, the phase differences between the antennas of an antenna array may be used. This means that phase errors in the radar receiver (and also in the radar transmitter, i.e. the whole radar device or radar system), such as phase differences between oscillation signals used in different components lead to errors in the angular detection (i.e. the determination of direction of arrival) and/or to errors in side lobes (i.e. affecting the probability of detection). This issue may be addressed by calibration-based compensations. However, such an approach typically cannot compensate entirely drifts (as it is working on an average drift), has limitations from functional safety perspective because of the variety of field situations, and can drastically increase radar device design and test costs by forcing for example to integrate a non-volatile memory or fuses to store silicon specific calibrations that would be calculated during additional specific tests.

Accordingly, enhanced approaches for compensating errors in radar reception data are desirable.

SUMMARY

According to various embodiments, an automotive radar arrangement is provided including a radar receiver configured to generate radar reception data from radio signals received by a plurality of radar receive antennas, a radar signal processor configured to determine an estimate of an angular position of at least one object by processing the radar reception data, a communication interface configured to receive information about a reference angular position of the at least one object, a determiner configured to determine a compensation for the radar reception data depending on the estimate of the angular position of the at least one object and the reference angular position of the at least one object, wherein the radar signal processor is configured to correct the radar reception data and/or further radar reception data for the detection of a further object by the compensation, and an output interface configured to provide information about the presence of the further object to a vehicle controller.

According to another embodiment, a method for object detection by vehicle radar according to the automotive radar arrangement described above is provided.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the described embodiments. In the following description, various aspects are described with reference to the following drawings, in which:

FIG. 10 shows diagrams illustrating virtual radar channels in case of two MMICs.

FIG. 16 shows an angle spectrum before compensation and after compensation of a power error according to an embodiment.

FIG. 23 shows a flow diagram illustrating a method for object detection by vehicle radar.

DETAILED DESCRIPTION

The following detailed description refers to the accompanying drawings that show, by way of illustration, specific details and aspects of this disclosure which may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Figure 1:
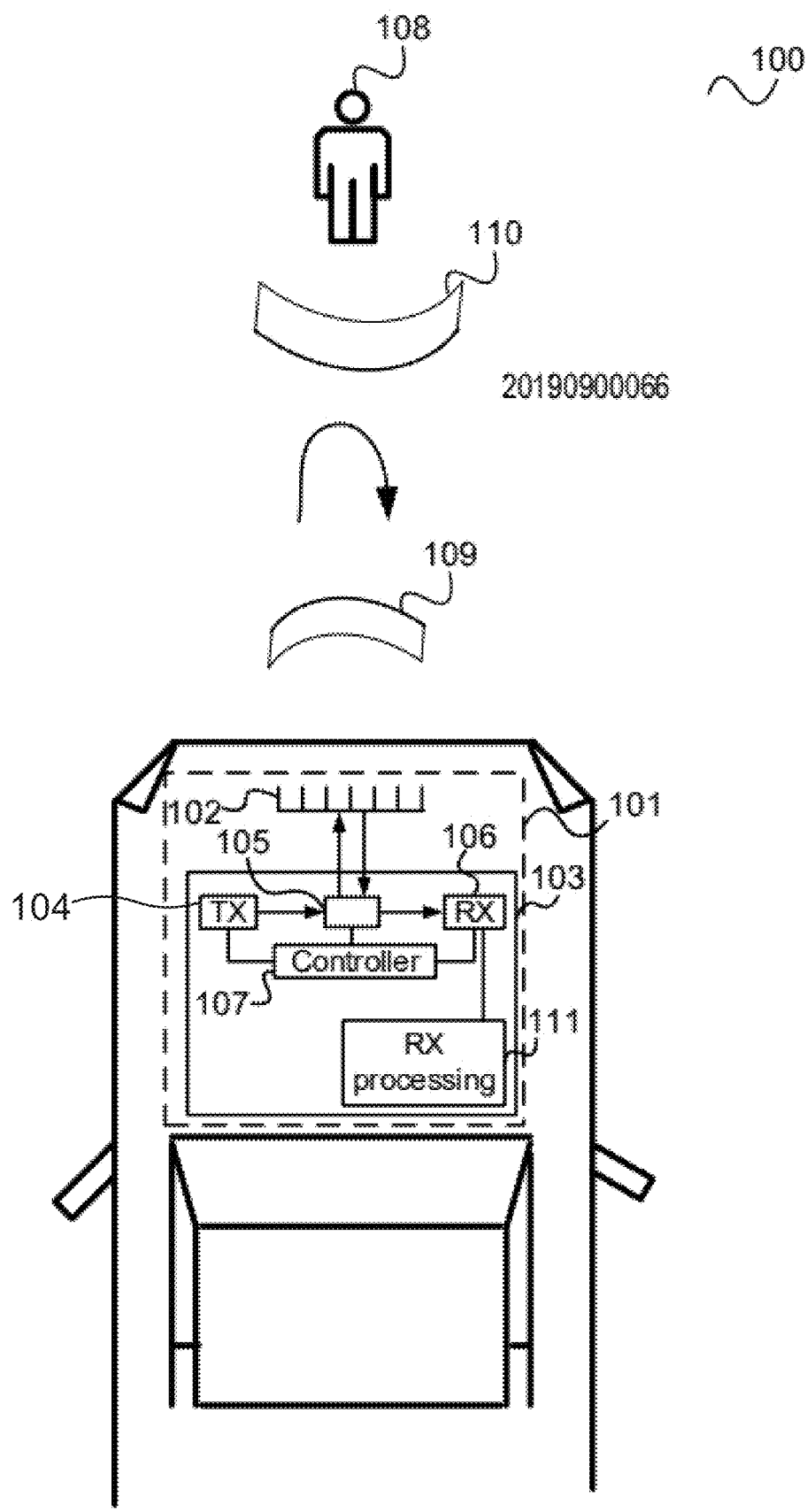
FIG. 1 shows a radar arrangement.

FIG. 1 shows a radar arrangement 100.

The radar arrangement 100 includes a radar device 101 that includes an antenna arrangement 102 and a radar control device 103. The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

1. The one or more transmitters 104 transmit a transmit signal 109 via the antenna arrangement 102.
2. The transmit signal 109 is reflected by a target;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

Figure 2:
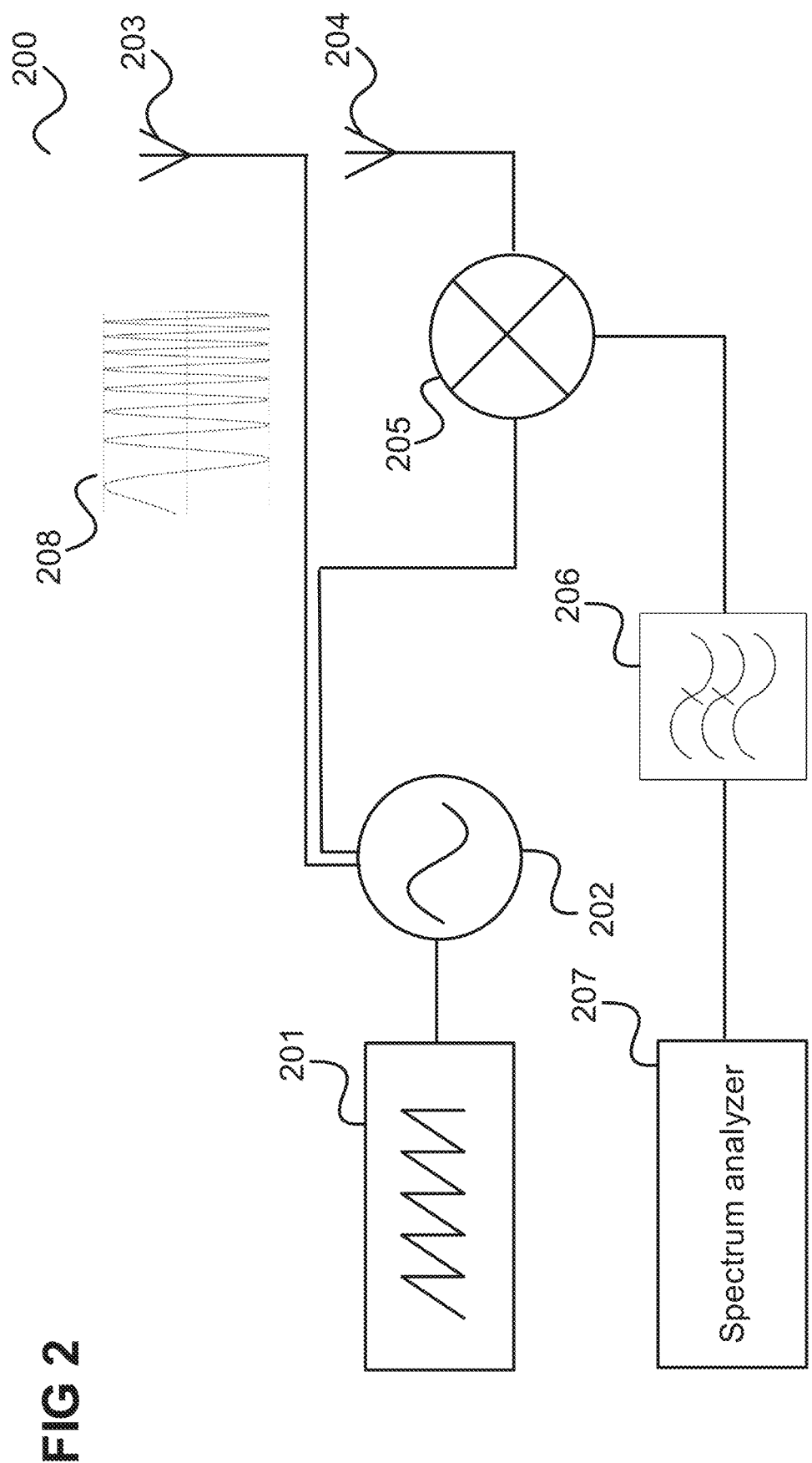
FIG. 2 illustrates an FMCW (Frequency Modulated Continuous Wave) radar system.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps, which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 102 may include a plurality of receive antennas, i.e. an array of receive antennas. The direction of an object 108 may then be determined from phase differences by which the receive antennas receive an echo from an object 108, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
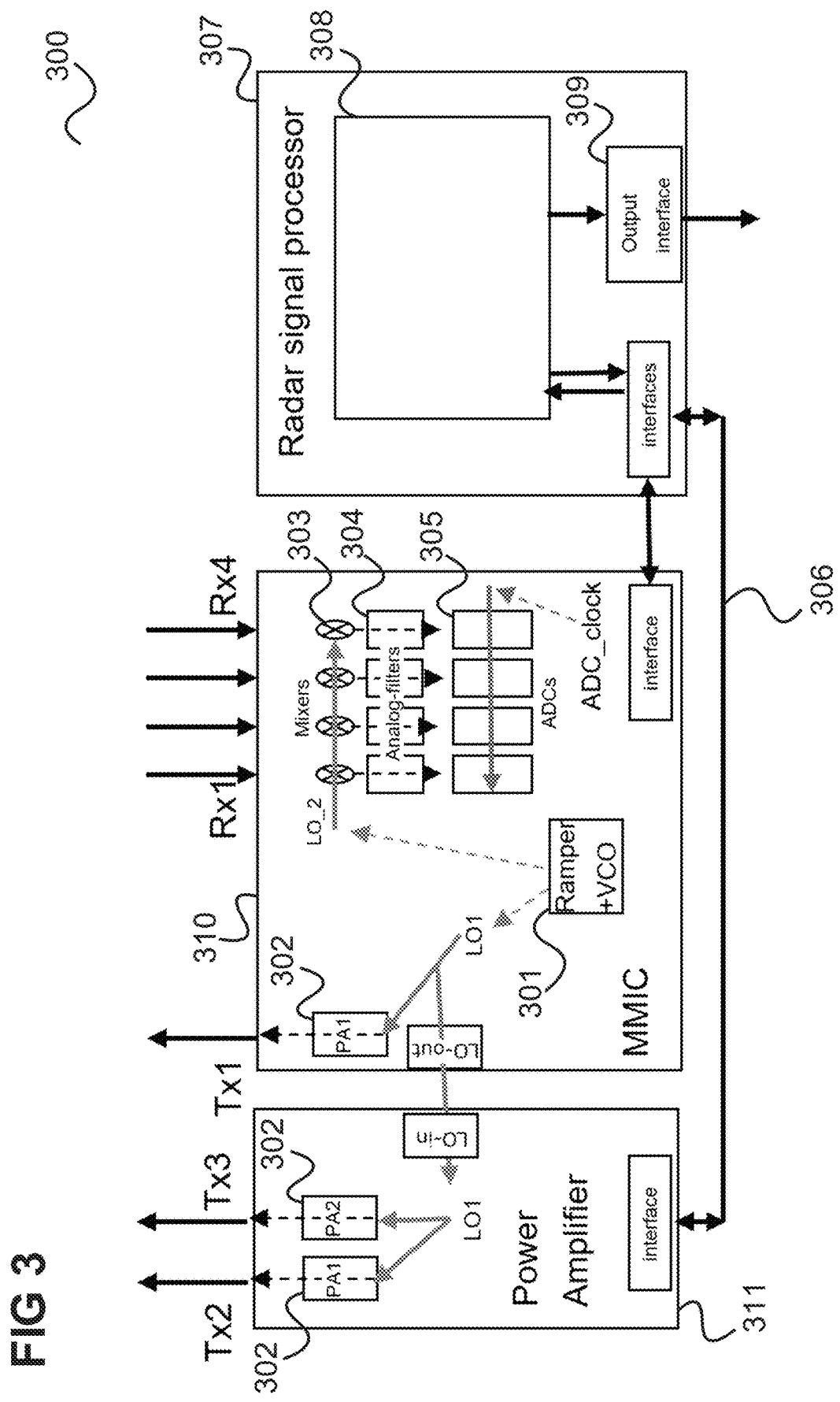
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via an transmit signal interface 312. However, the transmit amplifiers may also all be provided within the MMIC 310

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination of direction of arrival as explained below with reference to FIG. 5.

Since the number of receive signals that an MMIC may process in parallel is limited (and thus an MMIC can only serve a limited number of receive antennas), multiple MMICs may be cascaded to allow using a higher number of receive antennas and thus improve angular resolution of the radar device 101.

Figure 4:
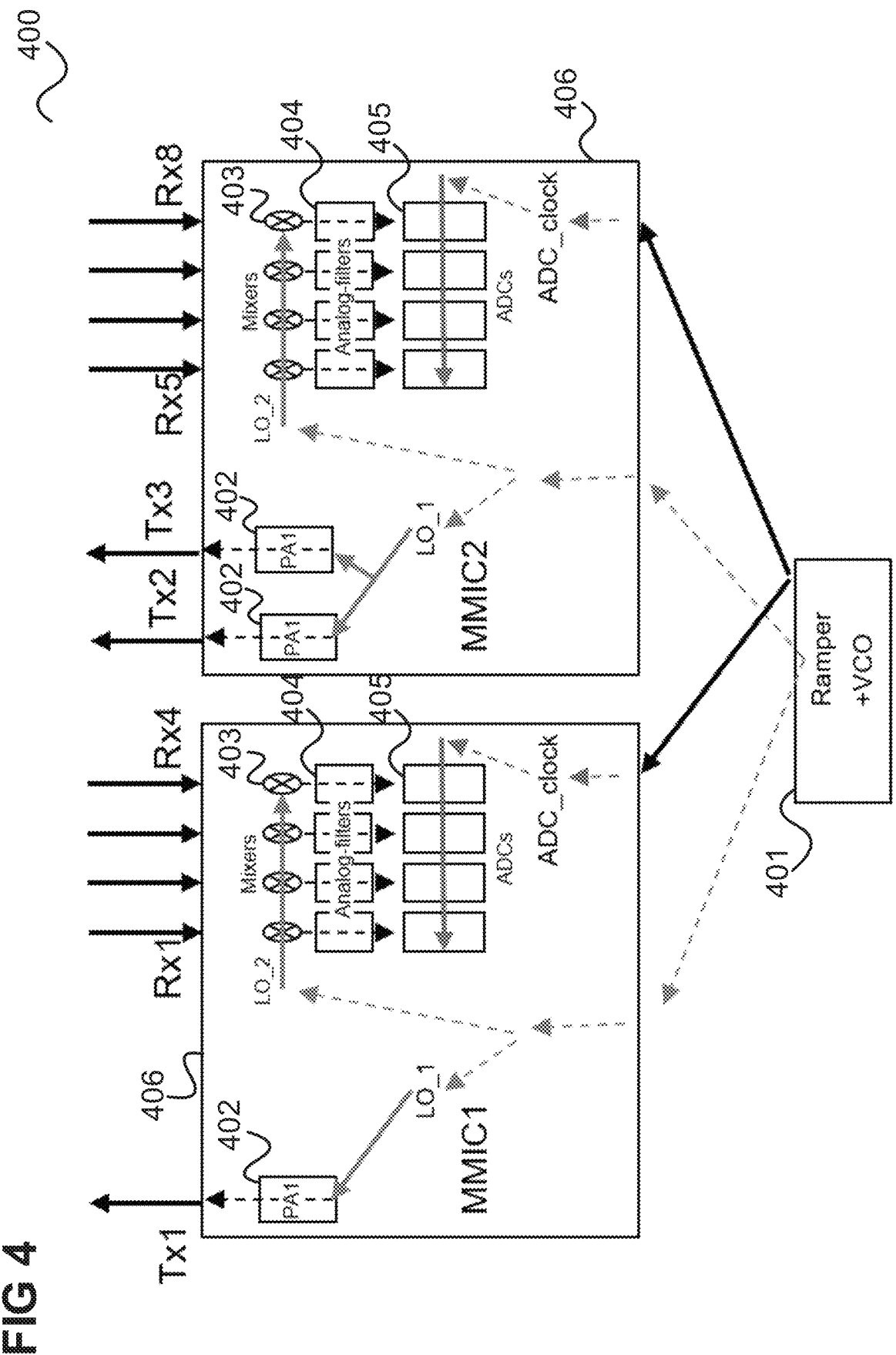
FIG. 4 shows a radar device having a plurality of MMICs (Monolithic Microwave Integrated Circuits).

FIG. 4 shows a radar device 400 having a plurality of MMICs 406.

The radar device 400 includes a (voltage-controlled) oscillator with ramper 401 which supplies transmit amplifiers 402 (one for each transmit antenna) and mixers 403 of the MMICs 406 with a transmit signal as described with reference to FIG. 2.

There is one mixer 403 in each MMIC 406 for each receive antenna of the respective MMIC 406. Analog filters 404 (corresponding to filter 206) filter the mixed signals and analog-to-digital converters (ADCs) 405 generate digital signals from the filtered analog signals. Similarly to the example of FIG. 3, the MMICs 406 may transfer their outputs via a digital interface to a radar signal processor (not shown in FIG. 4) which implements a spectrum analyzer and performs object detection and determination of direction of arrival as explained in the following with reference to FIG. 5.

Figure 5:
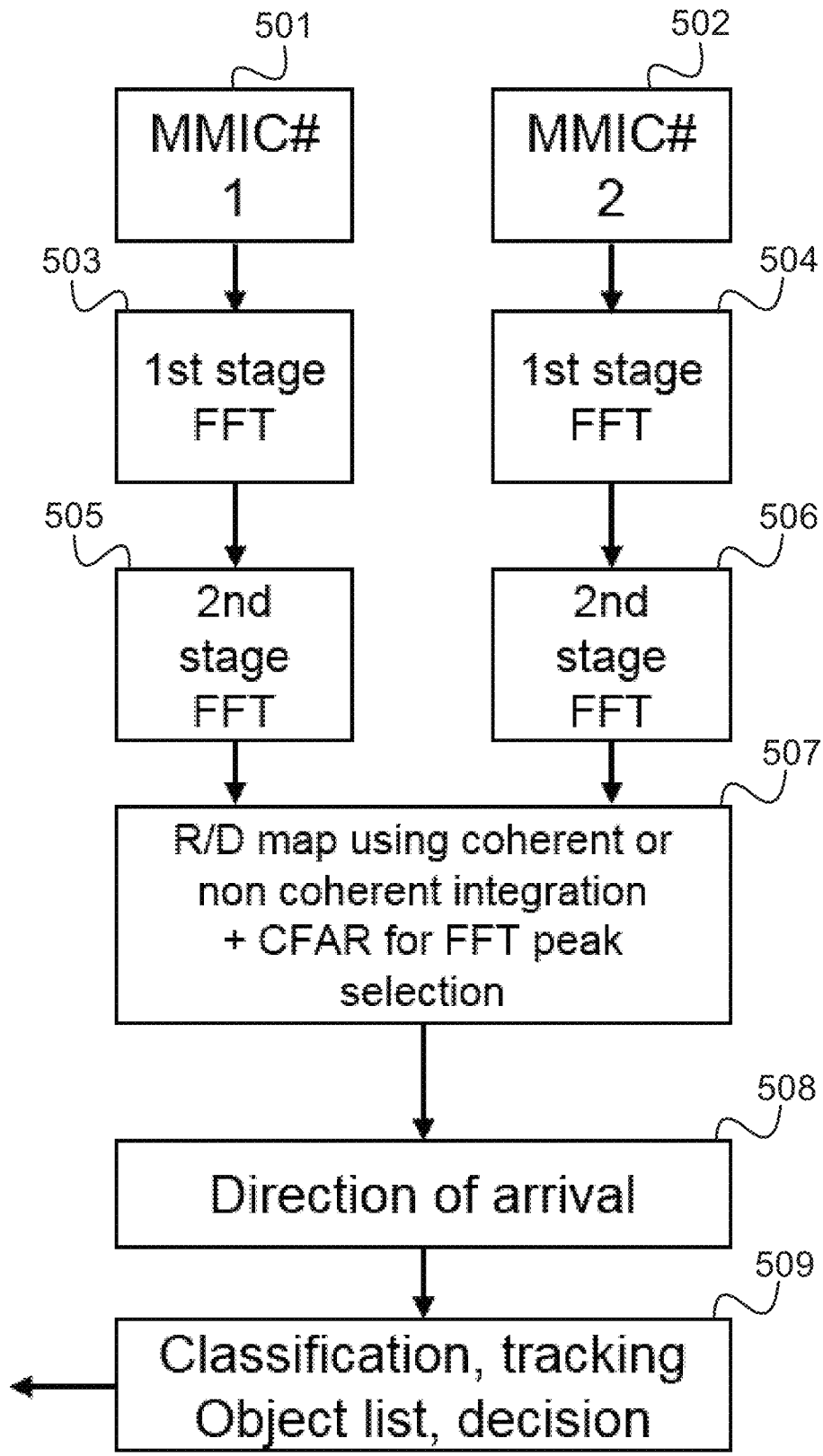
FIG. 5 illustrates the processing of radar signals received using two MMICs.

FIG. 5 illustrates the processing of radar signals received using two MMICs 501, 502.

MMICs 501, 502 are for example part of the receiver 106. Each MMIC 501, 502 is coupled with a plurality of antennas and is supplied with received signals from the respective plurality of antennas. The MMICs 501, 502 perform processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. Each MMIC 501, 502 supplies the resulting digitized receive signals to a respective first FFT (Fast Fourier Transform) stage 503, 504 and respective second FFT stage 505, 506 (e.g. implemented by a radar signal processor 307). Based on the outputs of the FFT stages 503-506 the radar signal processor 307 determines range information as well as velocity information (e.g. in form of a R/D (range/Doppler) map) for one or more objects in 507.

It should be noted that each second FFT stage 505, 506 outputs a two-dimensional FFT result (wherein one dimension corresponds to range and the other to velocity) for each antenna (namely based on the processing of the samples of the receive signal received by this specific antenna). The result of the first FFT stage 505 includes, for each receive antenna, a complex value for a range bin.

The FFT of the second FFT stage 506 goes over the result of the first FFT stage 505 over multiple chirps, for each range bin, generating, per range bin, a complex value for each Doppler bin. Thus, result of the second FFT stage 506 includes, for each receive antenna, a complex value for each combination of Doppler bin and range bin (i.e. for each Doppler/range bin). This can be seen to give an antenna-specific R/D map.

To generate an aggregate R/D map, the MMIC-specific R/D maps are combined together, e.g. by summing the up, for example by coherent or non-coherent integration. The velocity and range of specific objects may be estimated by identifying peaks in the R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 508, the radar signal processor 307 may further determine the direction of the one or more objects in 508. This can be done based on the phase differences of the output values of the second stage FFT between different receive antennas and may include a third stage FFT (angular FFT).

Based on the results of this processing, further processing such as object classification, tracking, generation of an object list and decision-making (e.g. in autonomous driving) may be performed in 509 (e.g. by a further component such as a vehicle controller). For this, the radar signal processor 307 may output the processing results via an output interface 309.

In the case of two MMIC 501, 502 the data cube which contains the digitized receive signals for all receive antennas is split into two parts, one for each MMIC 501, 502.

Figure 6:
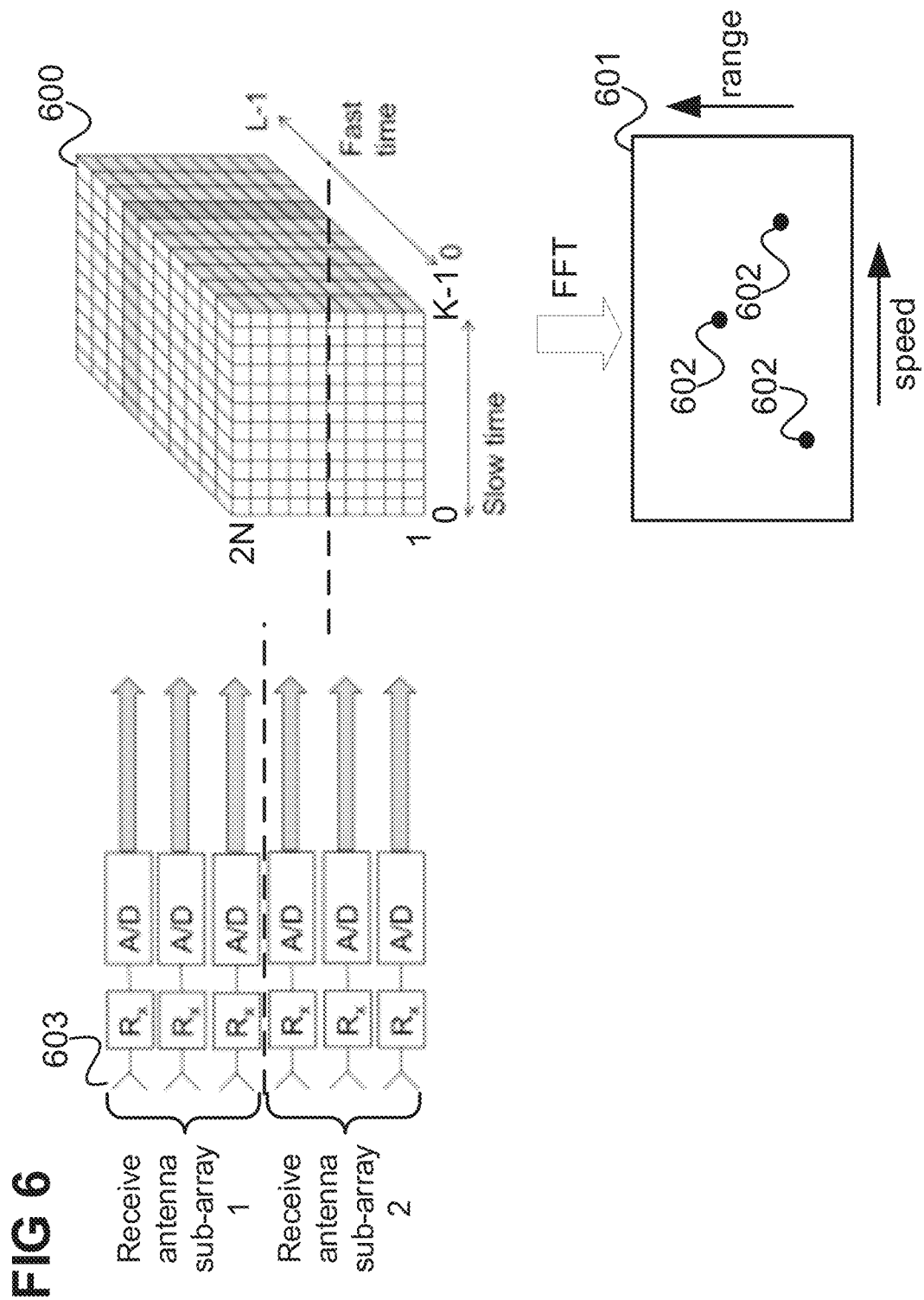
FIG. 6 shows a data cube.

FIG. 6 shows a data cube 600.

The data cube 600 includes digitized samples of receive signals from M antennas forming a receive antenna array 603 divided into two receive antenna sub-arrays. For example, the first MMIC 501 processes receive signals received by the first receive antenna sub-array and the second MMIC 502 processes receive signals received by the second receive antenna sub-array. In particular, the MMICs 501, 502 perform analog/digital conversion to generate the digitized samples.

For example, for each chirp, the received signal is sampled to have L samples (e.g. L=612).

The L samples collected for each chirp are processed by the respective first FFT stage 503, 504.

The first-stage FFT is performed for each chirp and each antenna, so that the result of the processing of the data cube 600 by the first FFT stage 503, 504 has again three-dimension and may have the size of the data cube 600 but does no longer have values for L sampling times but instead values for L range bins.

The result of the processing of the data cube 600 by the first FFT stage 503, 504 is then processed by the second FFT stage 505, 506 along the chirps (for each antenna and for each range bin).

The direction of the first-stage FFT is referred to as fast time, whereas the second-stage FFT direction is referred as slow time.

The result of the second-stage FFT gives, when aggregated over the antennas, a range/Doppler (R/D) map 601 which has FFT peaks 602 (i.e. peaks of FFT output values (in terms of absolute values) for certain range/speed combinations (i.e. for certain range/Doppler bins) which the radar signal processor 307 expects to correspond to detected objects 108 (of a certain range and speed).

In practical application, phase errors between multiple cascaded MMICs 501, 502 add phase errors to the second stage FFT results between different antennas that cause a loss of angular precision or even a loss of sensitivity. It should be noted that for angular detection an angular FFT may be performed in antenna direction (vertical axis of the data cube in FIG. 6)

High frequency signals of the same nature (i.e. transmit signals and receive signals) must have same length from their source and/or to their destination in order to avoid creating an unbalanced delay. Symmetry in delay can be defined by silicon design and by radar PCB (printed circuit board) and antenna design. Unfortunately, changes in temperature, in voltage and aging will create asymmetric changes in delay. A small delay creates a phase error while big a delay would not only create a phase error but also a frequency error when considering the fast-changing frequency during the chirps of an FMCW Radar.

Even single MMICs are not perfect; although most stringent measures are typically taken during their design, all measures cannot cope with each potential variation when considering manufacturing variations, variations induced by ECU conditions and aging.

For example, the arrows shown within the MMIC 310 illustrated the different paths that are introducing potential delays.

The principle of MIMO (multiple-input multiple-output) is to expand the aperture of the radar device using virtual channels formed by the combination of the receive antenna array and of the transmit antenna array. In the example of FIG. 3, where there are three transmit antennas (Tx1 to Tx3) and four receive antennas (Rx1 to Rx4) the result are 12 virtual channels as illustrated in FIG. 7.

Figure 7:
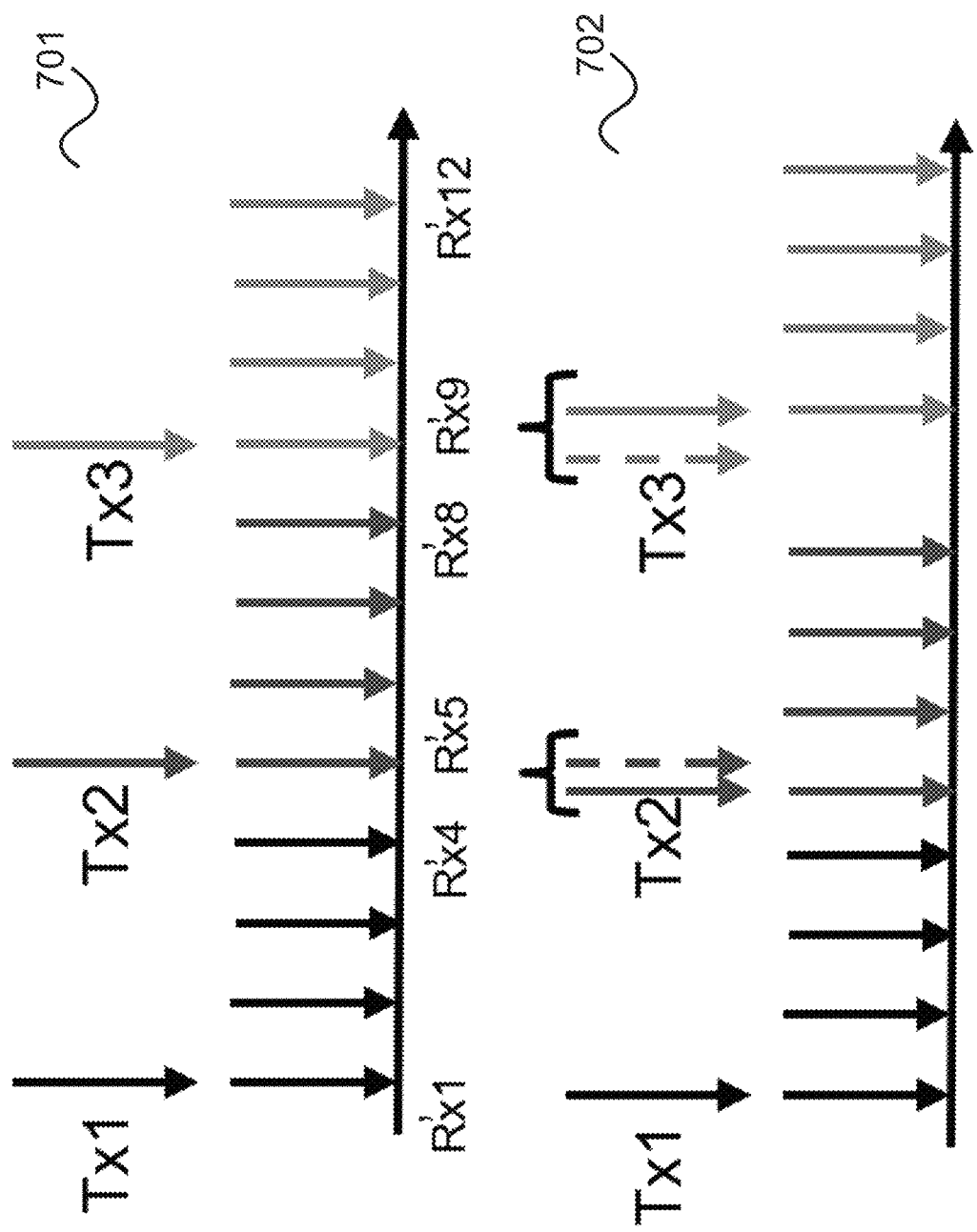
FIG. 7 shows diagrams illustrating virtual radar channels.

FIG. 7 shows diagrams 701, 702 illustrating virtual radar channels.

The first diagram 701 shows the virtual receive antenna array of the MMIC 310 assuming that the MMIC 310 is perfect (i.e. error-free). Each transmit antenna creates one virtual receive antenna per actual receive antenna (Rx1 to Rx4), resulting in twelve virtual receive antennas denoted as (Rx'1 to Rx'12). With the ideal phase differences between Tx1, Tx2 and Tx3, the virtual receive antennas form an antenna array of uniformly spaced receive antennas.

The second diagram 702 shows the virtual receive antenna array of the MMIC 310 assuming that the MMIC has phase errors (offsets) between its transmit antennas. Tx1 is used as reference and for Tx2 and Tx3 the dashed arrows show the theoretic position with the theoretic phase while the plain arrows show an examples of phase errors. Since each phase corresponds to a horizontal position in the virtual receive antenna array the phase errors of Tx2 and Tx3 have the effect that the positions of the virtual receive antennas Rx'5 to Rx'8 are shifted to the left (since Tx2 is "too early") and the virtual receive antennas Rx'6 to Rx'12 are shifted to the right (since Tx3 is "too late") assuming a radar signal arriving from the left.

Accordingly, the determination of angle of arrivals using the virtual receive antennas will have errors.

In a practical radar device, e.g. in a radar ECU (electronic control unit) in a vehicle, errors can be quite well compensated at the final test of the radar device by determining and setting corresponding calibration variables (or calibration values). Still, during its life time, a radar device will typically be exposed to conditions that create asymmetric phase changes compared to the ones compensated with the calibration variables. They can be for example asymmetric junction temperatures between Tx paths, asymmetric junction temperatures between Tx paths and Rx paths, asymmetric transmit powers between Tx paths, asymmetric losses on the RF circuit substrate due to uneven temperatures on the substrate, and asymmetric losses and asymmetric gain between Rx paths.

A radar device implemented using a single MMIC and an external power amplifier (as illustrated in FIG. 3) is affected by similar errors as a radar device with a single MMIC (and all transmit amplifiers within the MMIC), except that the amplitude of errors will be different due to the phase error induced by the LO signal going across 2 components instead of 1 component.

Figure 8:
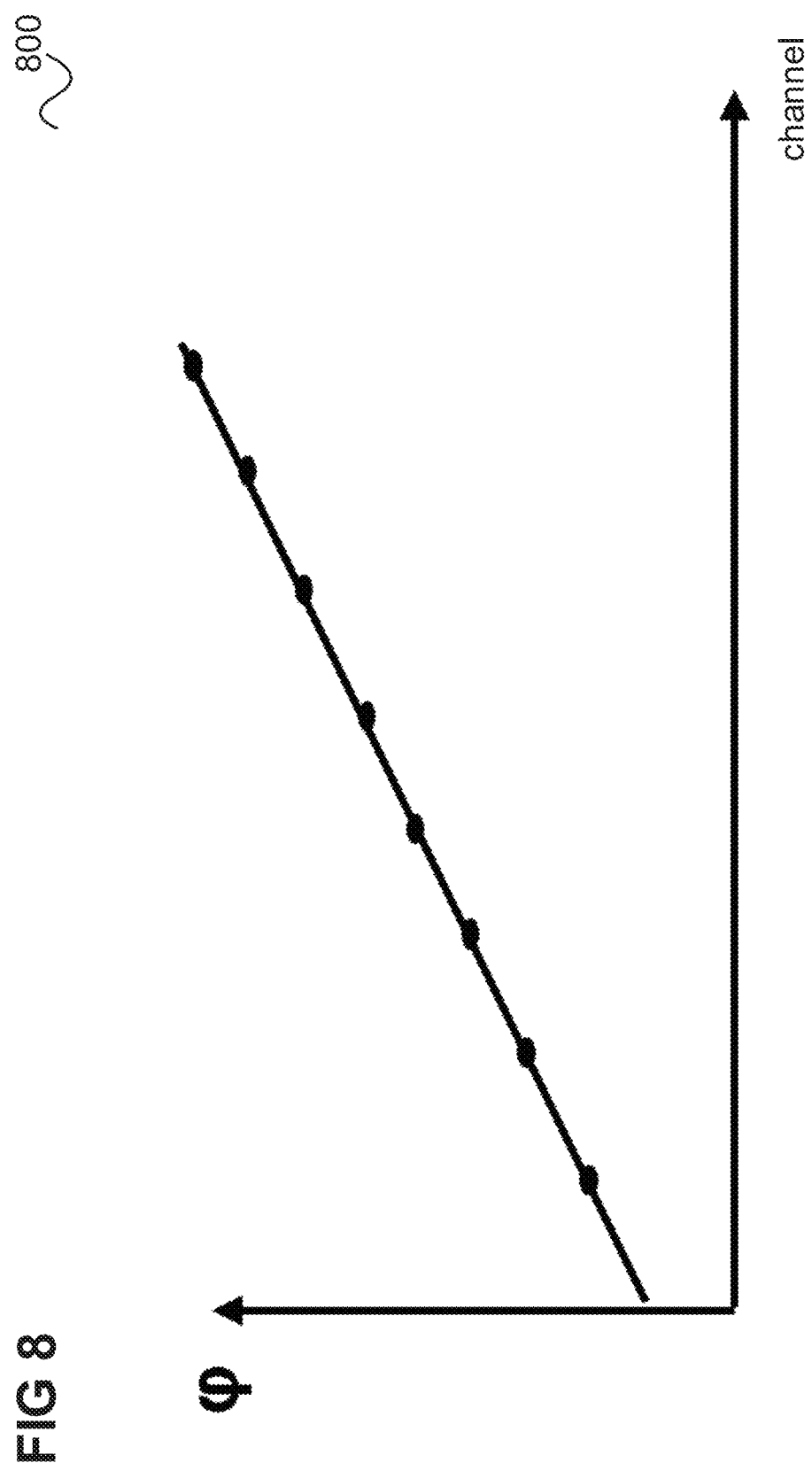
FIG. 8 shows a diagram illustrating the ideal relation between antenna number and phase.

FIG. 8 shows a diagram 800 illustrating the ideal relation between antenna number (or number of Rx channel, indicated along the x-axis) and phase (indicated along the y-axis).

The ideal relation is that the phase various linearly over the receive antenna array (according to the direction the object 108 has with respect to the antenna arrangement 102). It should be noted that it is assumed that the antennas are numbered in the order as they are arranged in the antenna array.

Figure 9:
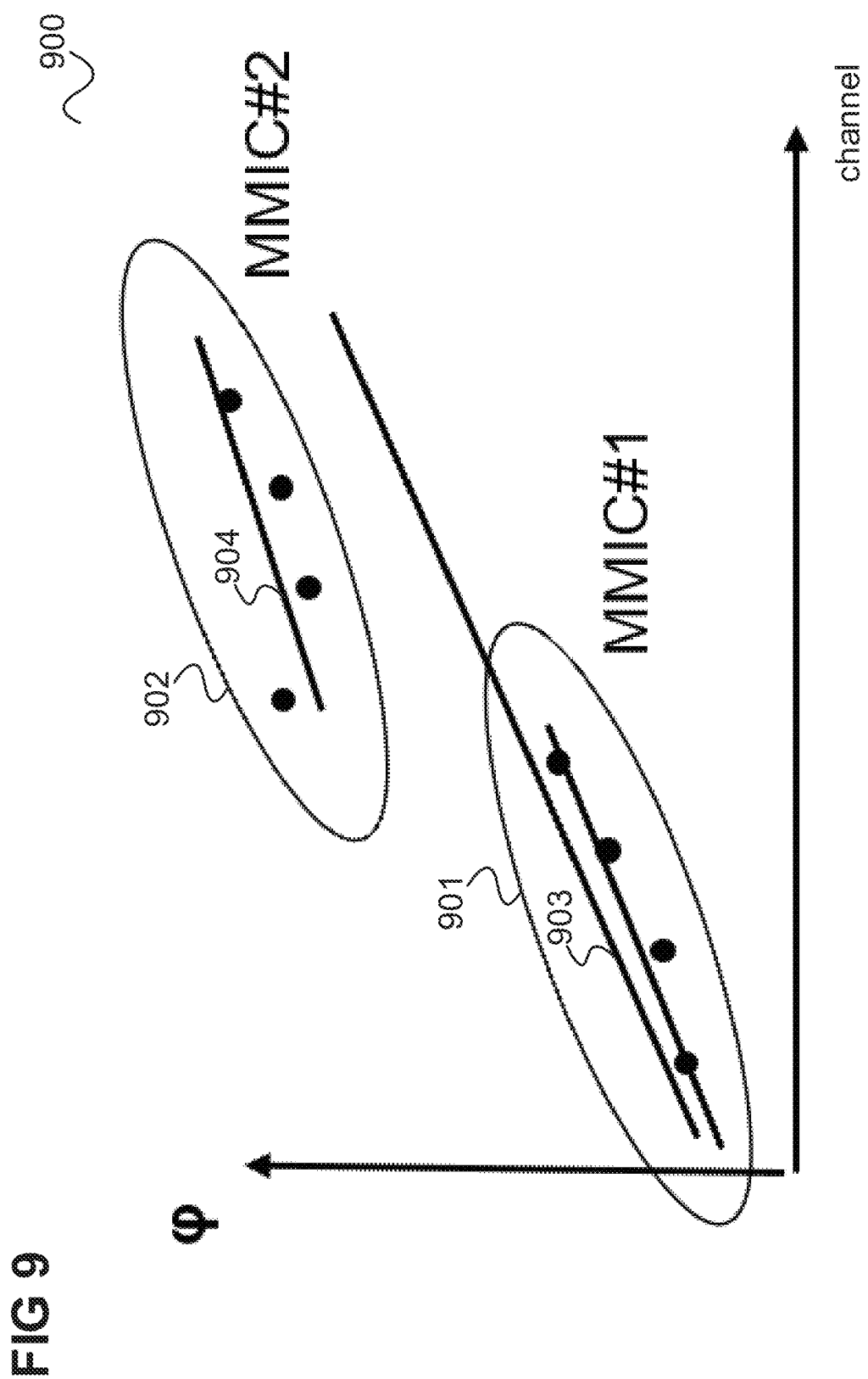
FIG. 9 shows a diagram illustrating an example of the relation between antenna number and phase as it may occur in practical application.

FIG. 9 shows a diagram 900 illustrating an example of the relation between antenna number and phase as it may occur in practical application.

It is assumed that first four samples (from left to right) forming a first sample group 901 belong to channels served by a first component and the fifth to eighth samples forming a second sample group 902 belong to channels served by a second component. As illustrated by lines 903, 904, there is an almost linear relation between phase and antenna number within each sample group 901, 902. However, between the sample groups 901, 902, there is a discontinuity due to a phase error between the components.

When several MMICs are cascaded to form a coherent receive array with Tx channels coming from each of the MMIC, the combined effects of delays are generating much more complex measurement errors. An example would be two arrange two of the MMIC 310 next to each other (e.g. controlled by a master MMIC distributing oscillation and clock signals to the MMICs; the master MMIC may be a dedicated MMIC or one of the two MMICs).

In addition to the sources of delay errors within one MMIC (as illustrated in FIG. 3), additional errors may arise due to asymmetries between the MMICs, in particular in the distribution of oscillation signals and clock signals to the MMICs.

FIG. 10 shows diagrams 1001, 1002 illustrating virtual radar channels in case of two MMICs.

In this example, there is one MMIC with two transmit antennas (Tx1, Tx2) and four receive antennas (Rx1 to Rx4) and one MMIC with one transmit antenna (Tx3) and four receive antennas (Rx5 to Rx8). This results in 24 virtual receive antennas (Rx'1 to Rx'24).

The first diagram 1001 shows the virtual receive antenna array of the MMICs assuming that the MMICs are perfect (i.e. error-free). With the ideal phase differences between Tx1, Tx2 and Tx3, the virtual receive antennas form an antenna array of uniformly spaced receive antennas.

The second diagram 1002 shows the virtual receive antenna array that the MMICs have phase errors (offsets) between its transmit antennas. Specifically, in the second diagram, the results of phase errors between transmit antennas (indicated by #1, #2) and between the MMICs (indicated by #3) are indicated.

It can be seen that complexity of the errors is drastically increased when using multiple MMICs compared to the usage of a single MMIC.

With cascaded radar components, additional reception errors can be caused by differential phase delays between the local oscillation signal (supplied to mixers 303) at each of the reception sub-arrays of, e.g. a first MMIC and a second MMIC. Similarly, clock skew of ADC clocks can lead to measurements errors.

This results in groups of samples (e.g. Doppler FFT stage output samples) with phase differences leading to a situation as illustrated in FIG. 9 (assuming two MMICs and a single transmitter for simplicity).

Typically, an MMIC uses two main techniques for signal sampling: real sampling or I/Q (in-phase/quadrature) sampling. While the examples before have been focused on real sampling, the approaches described herein are also applicable to I/Q sampling for which several measurement errors can be generated by the MMIC and corrected in the frequency domain during signal processing.

For example, because of their complexity, I/Q sampling circuits may suffer from asymmetry across Rx channels. This asymmetry will typically generate angular errors (i.e. errors in angular detection of objects).

Figure 11:
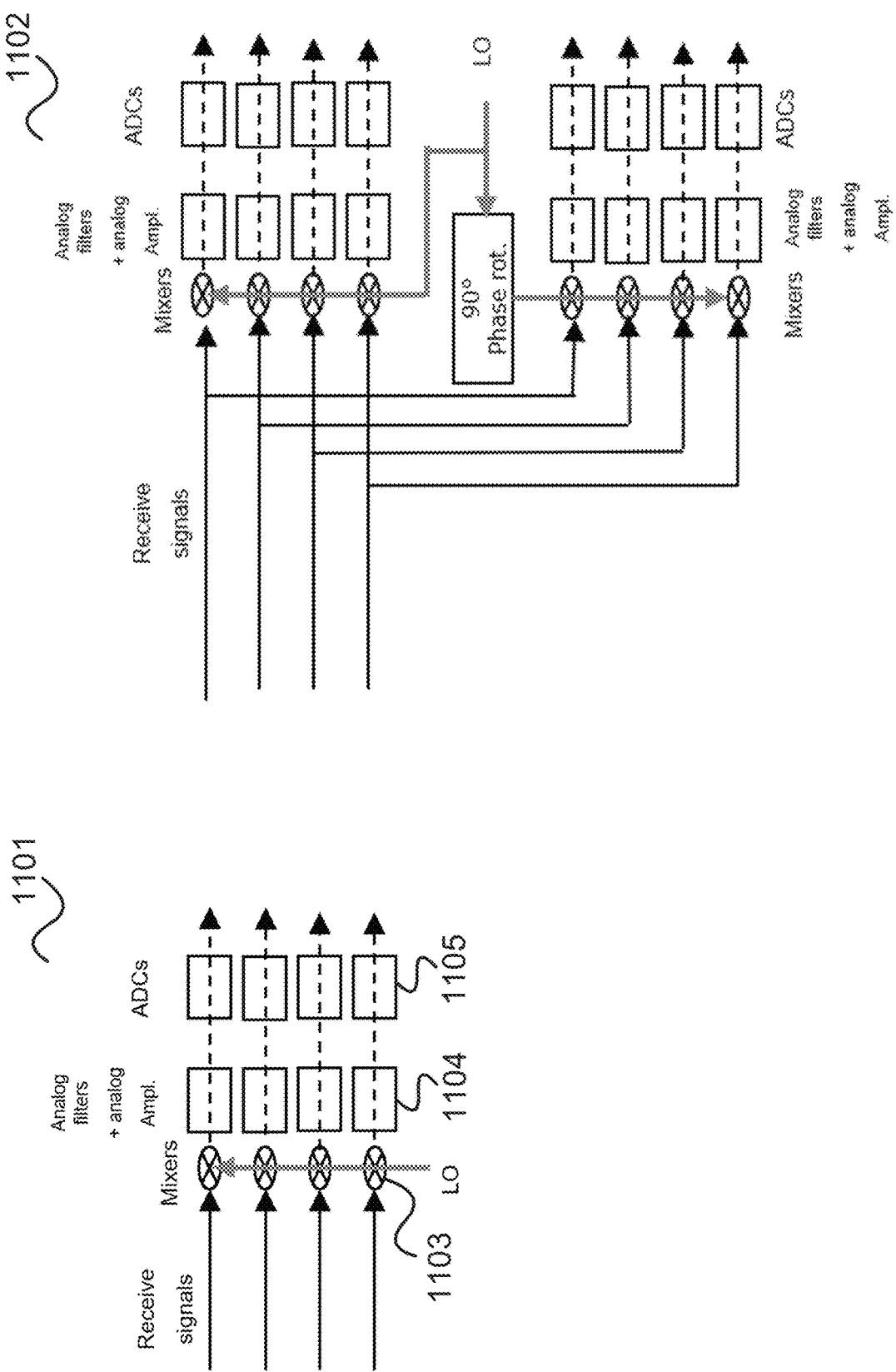
FIG. 11 shows a comparison of a real receiver and an I/Q receiver.

FIG. 11 shows a comparison of a real receiver 1101 and an I/Q receiver 1102.

The real receiver 1101 includes, as explained with reference to FIGS. 2 and 3, a mixer 1103, a filter 1104 and an analog-to-digital converter 1105 per receive path.

The I/Q receiver 1102 includes two such blocks, wherein the mixers of one block are supplied with an oscillation signal which has a 90° phase shift with respect to the oscillation signal supplied to the mixers of the other block.

Having twice as much analog components, I/Q receivers are more subject to asymmetries across reception channels.

Amplitude and phase imbalance (I/Q imbalance) seriously degrade the performance of FMCW radar systems with a quadrature demodulator. Some patterns of IQ imbalance between channels affects the direction-of-arrival (DOA) estimation, as the array manifold deviates from the ideal model. More generally, the effects caused by imbalance in I/Q receivers depends on the pattern of the imbalance: whether the imbalance is symmetric on I/Q or if is it not symmetric; whether the symmetry is across a specific Rx or across all Rx.

In view of the potential errors induced by MMIC reception errors, an approach could be to improve MMIC design and test in order to have almost perfect MMICs. However, this would lead to having complex and expensive MMICs, preventing, because of their cost, autonomous driving to benefit of radar sensors.

Another approach are software compensations by identifying individual causes of error and trying to compensate them where corrections are coming from characterization results. The compensation values are typically referenced as "calibration values". However, pre-computed calibration values may not be valid for all conditions, e.g. due temperature variation. In such a local compensation done in the life time of a radar device (e.g. a radar electronic control unit (ECU)) an error value or vector (i.e. one or more compensation values) may be determined based on measurements of temperature, voltage etc. However, this approach is limited in that it is based on knowledge of average silicon variations and does not account for outliers. This means with that with such a compensation, only a part of the error(s) can be compensated.

Further, the use of calibration becomes complex to use when trying to calibrate parameters that have opposite variations against external parameter like temperature. In term of functional safety, open loop compensation (such as the calibration mentioned above) is also weak as not being able to consider specific and low probability situations. For ASILB (Autonomous Safety Integrity Level B), this means calibration should cover 90% of all potential situations in the field.

Therefore, according to various embodiments, a closed loop compensation approach is provided which allows to correct errors in a single pass or in an iterative way.

In the following, examples are given for the case of a FMCW radar system (including one or more radar devices, in particular one or more radar transmitters and one or more radar receivers). The radar system may or may not be a MIMO radar system and may use any form of modulation (like for example: TDM (Time Division Multiplexing), DDM (Doppler Division Multiplexing), BPSK (Binary Phase Shift Keying)). Embodiments are valid for a radar system having a single MMIC or having multiple MMICs. The radar system may also be a PMCW radar system or an OFDM (Orthogonal Frequency Division Multiplexing) radar system. The embodiments are also valid for a radar system using MMICs with or without signal processing capabilities.

Figure 12:
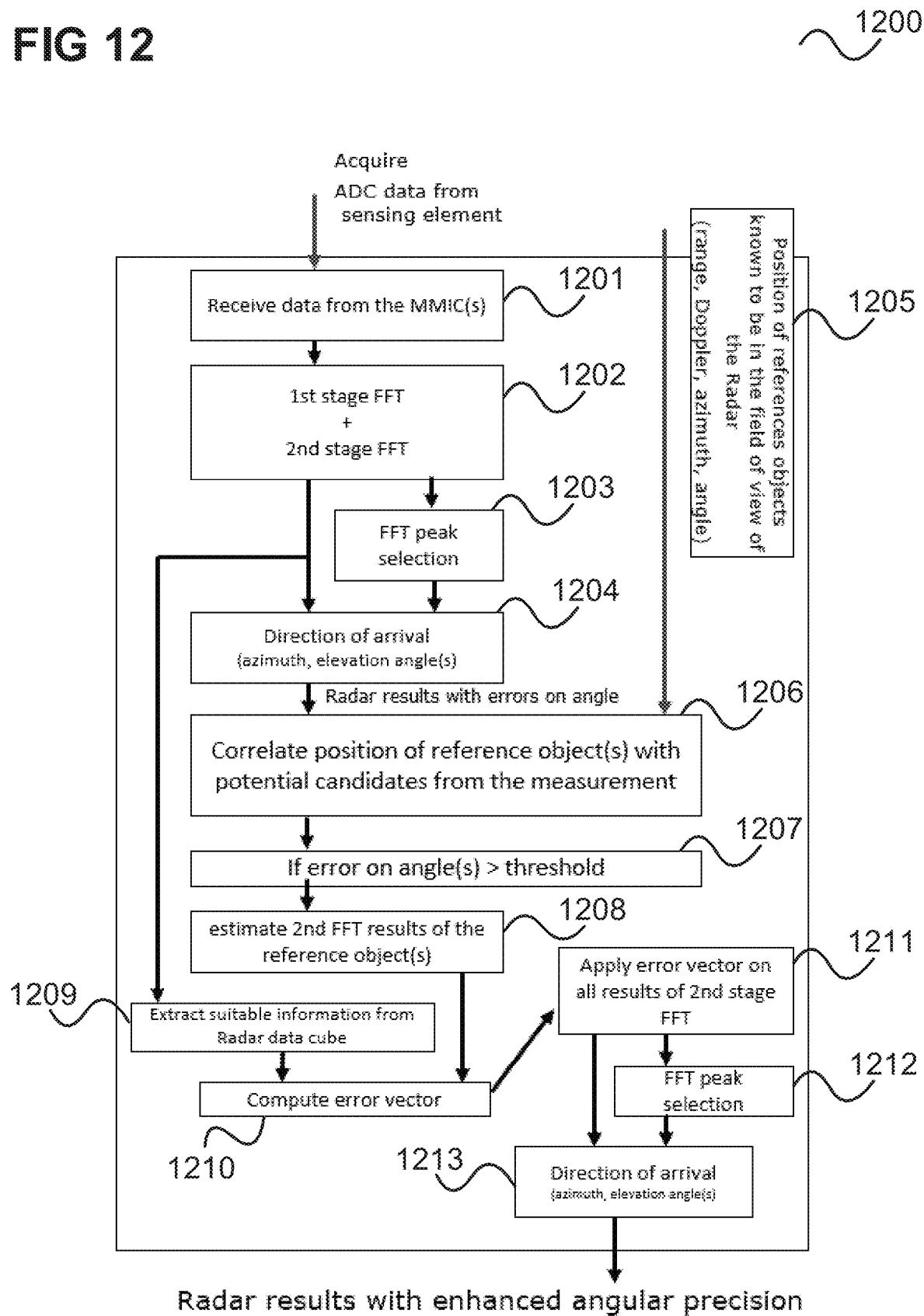
FIG. 12 shows a flow diagram illustrating a method for correcting radar reception data according to an embodiment.

FIG. 12 shows a flow diagram 1200 illustrating a method for correcting radar reception data according to an embodiment.

In 1201, raw radar reception data is received from one or more MMICs. The raw radar reception data for example corresponds to the data of the "raw" data cube 600.

In 1202, the raw radar reception data is processed by a first FFT (also referred to as range FFT) and a second FFT (also referred to as Doppler FFT) as described above with reference to FIGS. 5 and 6.

In 1203, FFT peak selection is performed on the second stage FFT output.

In 1204, determination of direction is performed. This may include determination of an azimuth angle and/or an elevation angle.

The result of the processing so far are one or more detected objects and for each object a range estimate, a Doppler estimate and a direction estimate (which may include one or more angles). However, as explained above, there may be errors in the estimates, in particular in the direction estimates.

For compensation of these errors, in 1205, information about one or more reference objects is obtained via a communication interface such as a vehicle bus (e.g. a Controller Area Network) interface. The one or more reference objects are objects in the field of view of the radar system such that it can be assumed that each reference object corresponds to one of the detected objects. The reference information for each reference object includes positional information of the reference object, for example a reference range from the radar system, a reference velocity (i.e. a Doppler value specifying the relative speed to the radar system) and a reference direction with respect to the radar system (e.g. azimuth angle and elevation angle).

In 1206, the reference objects are correlated with the detected objects using the estimated values and the reference information. For example, a reference object is correlated (i.e. paired) with a detected object which is closest to the reference object in terms of range, velocity and direction. For example, a matching value is determined for each detected object by averaging the difference between the estimates of the detected object and the reference values of the reference object in terms of range, velocity and direction and the detected object with the best matching value is paired with the reference object.

In 1207, it is determined whether the error between the reference direction and the estimated direction for any pair of detected object and reference object is above a threshold (e.g. 1%, 2%, 5% etc.).

If that is the case, second stage FFT results of the reference objects are generated in 1208. For example, some typical FFT values giving rise to typical peaks and phases corresponding to the reference information are generated (for example using historical data of the earlier detections of objects).

In this example, the radar reception data that is to be corrected is the output of the second stage FFT. It may be in the form of a (processed) data cube arising from the (raw) data cube 600 by applying the two FFT stages.

Accordingly, in 1209, second stage FFT results are retrieved (e.g. from the processed data cube) and in 1210 an error value or vector (of one or more compensation values) is calculated between the second stage FFT results generated for the reference objects and the second stage FFT results for the detected objects paired with the reference objects.

In 1211, this error value or vector (also referred to as compensation (value or vector)) is applied to some or all of the second stage FFT results (e.g. to FFT results of peaks corresponding to detected objects which have not been paired with any reference objects).

In 1212 and 1213 FFT peak selection and direction of arrival determination is performed using the second stage FFT results correct in this manner.

In summary, an embodiment can be seen in modifying the flow of FIG. 5 by adding a computation to correlate the position of reference objects with the detections determined by the radar, a computation to estimate an error vector, a computation to apply this error vector to the radar reception data (part or entire (processed) data cube of the radar system) and computations to obtain enhanced positions for all the detections of the radar system.

In the example of FIG. 12 this approach is applied in the context of sensing parameters that are leading to errors to be compensated after the second stage FFT. Depending on the types of errors and their induced effects, a similar approach can also be applied to first stage FFT result data or to third stage FFT (FFT for direction determination) result data.

As described above, high resolution radar is in practical application subject to multiple errors from each MMIC and from MMIC cascading. The principle described above with reference to FIG. 12 can be used in various high-level error computing and compensation flows for error correction in such a scenario.

Figure 13:
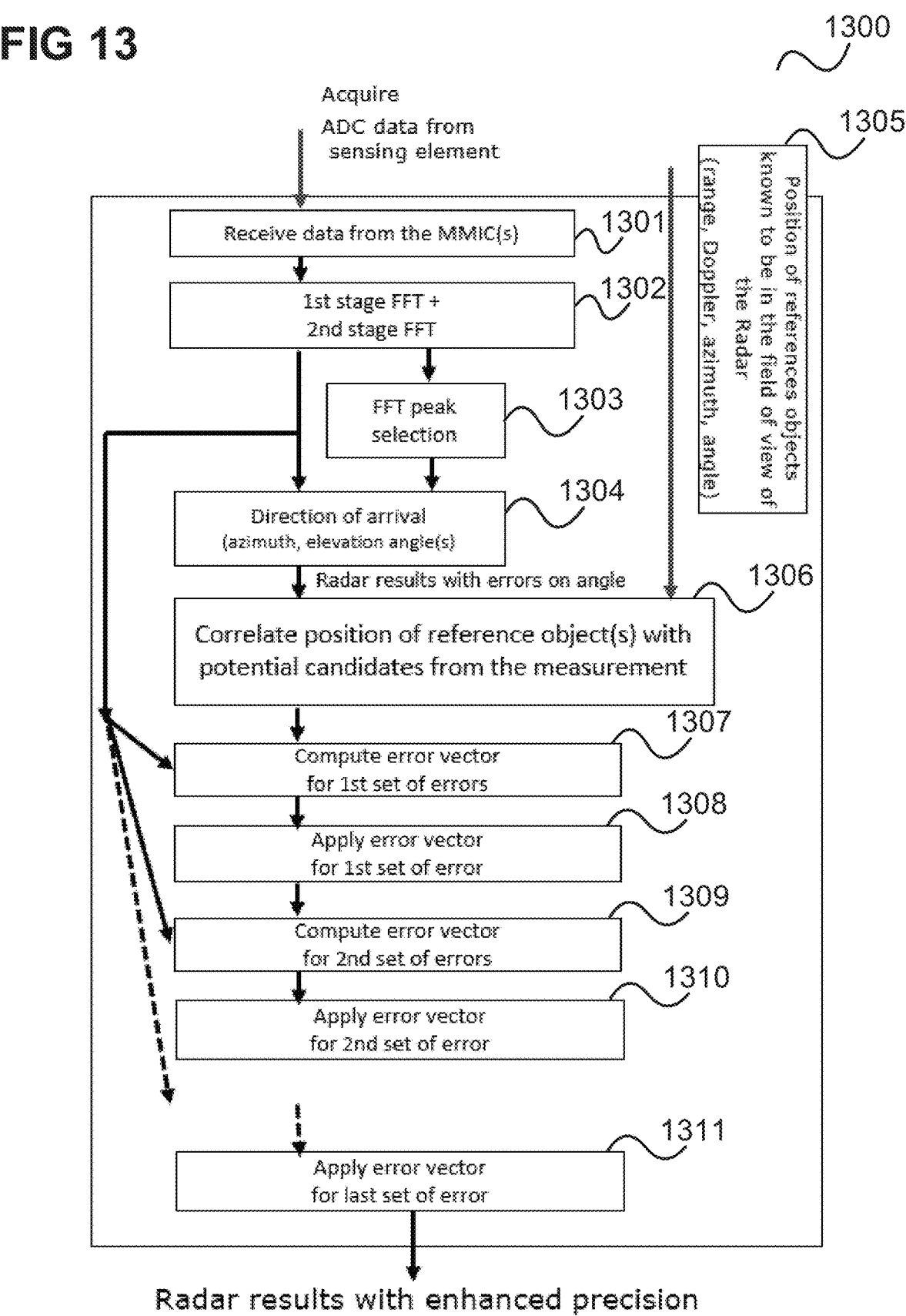
FIG. 13 shows a flow diagram illustrating a method for correcting radar reception data in a high-resolution radar system according to an embodiment

FIG. 13 shows a flow diagram 1300 illustrating a method for correcting radar reception data in a high-resolution radar system according to an embodiment.

1301 to 1306 are similar to 1201 to 1206 of the method of FIG. 12. Then, in 1307 to 1311, the computation of an error vector and application of an error vector (e.g. of 1207 to 1213) is iteratively applied to correct multiple independent errors.

This means that the principle of FIG. 12 is used iteratively or sequentially to correct multi-level reception errors. For example, if the radar system's antenna array has a smaller coherent array (sub antenna array) for one or for a few of its MMICs, an error compensation vector may be computed and applied to correct a first single MMIC error and then by analyzing results on the entire MIMO array of the radar system to compute an apply a compensation vector on the entire antenna array. Ultimately, complexity of the computation of the error vector may be the basis of the decision of the way correction vectors are computed.

In the following, an example of a computation flow to correct an angular error resulting from, for example, MMIC errors like error in the phase of the transmitter(s) during radar reception data acquisitions, is described.

Figure 14:
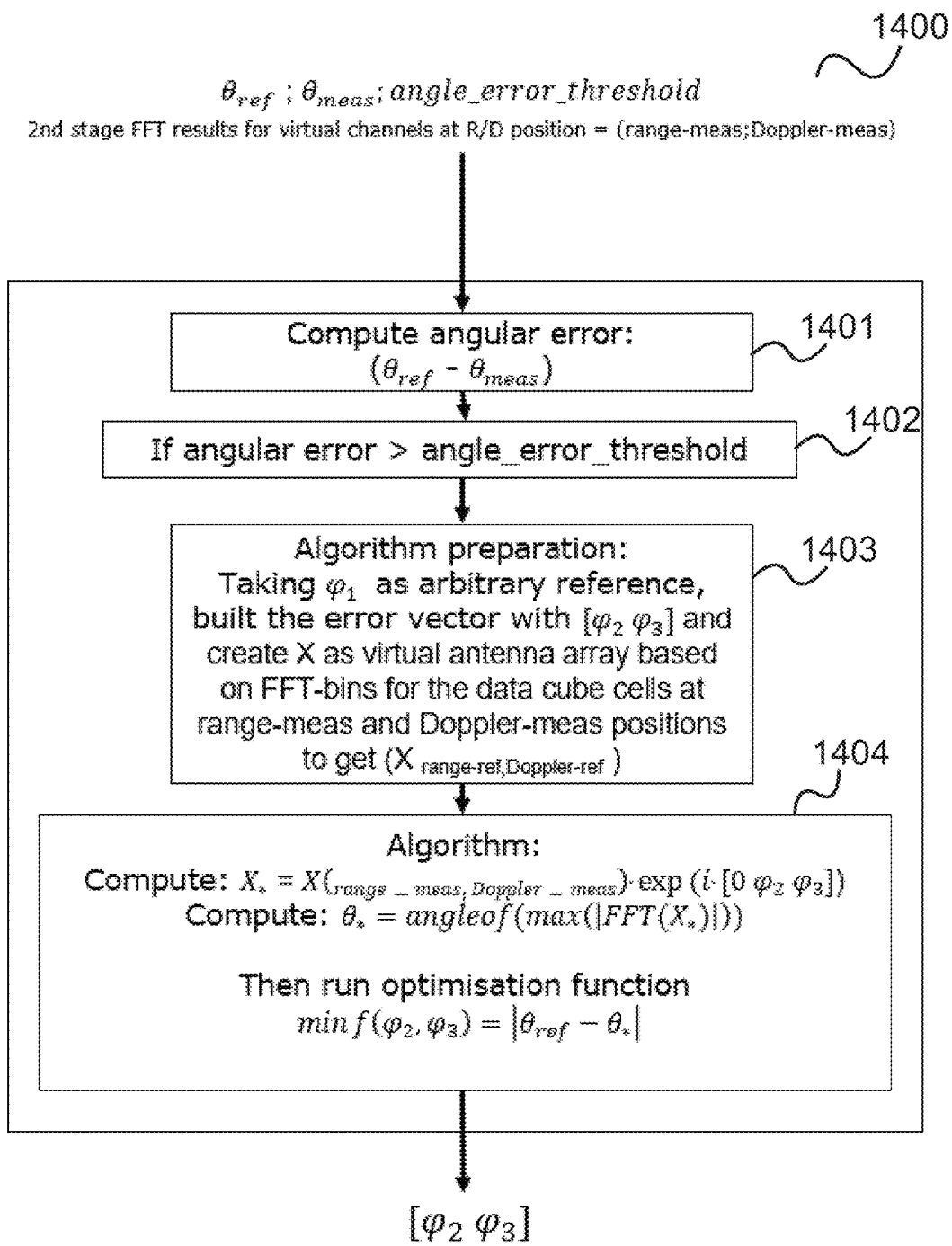
FIG. 14 shows a flow diagram illustrating a processing flow for calculation of a phase error compensation.

FIG. 14 shows a flow diagram 1400 illustrating a processing flow for calculation of a phase error compensation.

For the example of FIG. 14, it is assumed that a radar system with three transmit antennas (Tx1, Tx2, Tx3) and four receive antennas (Rx1, Rx2, Rx3, Rx4) is used. So, there is a virtual antenna array with twelve (3×4) antennas and the reception data for each range/Doppler bin is a vector X of twelve elements, each being a complex value.

In this example, only an azimuth compensation is determined (but the same concept may be applied for elevation compensation).

Reference object information is for example obtained from a (geographical) high resolution map and includes a range reference range_ref, a Doppler reference Doppler_ref and an azimuth reference $\theta_{ref}$ for a reference object (only one is used for simplicity, multiple reference objects may for example be considered by averaging).

The information for the corresponding detected comes from local computations based on the received data (range_meas, Doppler_meas, $\theta_{meas}$).

Taking $\varphi_1$ as the phase value for Tx1, the compensation to apply on the phase values for Tx2 and Tx3, denoted as [$\varphi_2$ $\varphi_3$], should be computed.

For more accurate compensation, the error can be computed based on several reference objects and an average of multiple compensations [$\varphi_2$ $\varphi_3$] can be taken as compensation.

In 1401, the angular error between the detected object and the corresponding reference object is computed.

In 1402, it is checked whether the angular error is above a threshold. (If that is not the case, the procedure ends.)

If that is the case, in 1403, an FFT output vector Xrange-ref, Doppler-ref is generated for the range/Doppler bin at which is the FFT peak which gave rise to the detection of the detected object.

In 1403, the compensation [$\varphi_2$ $\varphi_3$] is determined by minimizing $f(\varphi_2,\varphi_3)=|\theta_{ref}-\theta^*|$ wherein $\theta$=angle of(max($|FFT(X^*)|$))

is the angle or index from FFT of X* with maximum absolute value and $X^*=X$(range-meas;Doppler-meas)$*\exp(i*[0\varphi_2\varphi_3])$ is the FFT output vector where the components corresponding to Tx2 and Tx3 are rotated by the error compensation vector.

A similar processing flow can be used for angular error compensation for compensation of a (single-parameter) error like for example a LO phase error in a cascaded configuration.

The minimization of the optimization function f will search the values of [$\varphi_2$ $\varphi_3$] which minimizes the error on the target object.

Various optimization functions can be used to compute the error compensation.

An alternative is for example to minimize $f(\varphi_2,\varphi_3)=|idx_{ref}-idx^*|$ where $idx_{ref}$=index of(max($|FFT(X^*)|$))

is the index of the peak in the angular FFT for the reference object (and thus the correct index of the peak of the detected object) and idx. the actual index of the peak of the angular FFT for the detected object.

Other approaches for calculating the compensation may for example include the use of neural networks (trained to determined compensations for errors between reference information and information determined from radar reception data). Such a neural network may also receive a reference information (e.g. reference angular position) and information determined from radar reception data (i.e. an estimated angular position) as input and may be seen to generate a compensation by performing a comparison of these two inputs.

For multiple reference objects that are correlated with corresponding detected objects, multiple compensation values (or vectors) may be calculated. These may then be combined (e.g. by averaging) to find compensation value or vector. One approach is to calculate a multidimensional compensation where the compensation to be applied to values of a detected object depends upon the range of the detection of its velocity (i.e. Doppler bin).

Differences in the power of transmit antennas can lead to increased side lobes in the angular spectrum (i.e. angular FFT output). A similar approach as the one above to compensate phase differences may be used to determine an error compensation vector (or value) to for transmit power errors (and thus reduce the level of side lobes).

This may for example be done by replacing the phases $\varphi2$, $\varphi3$ of transmit antennas by offset powers P2, P3 for Tx2 and Tx3 in the algorithm of FIG. 14 and maximizing an optimization function to maximize the side lobe rejection around the respective angular FFT peak:

$\max f(P_2,P_3)=|P_{ref}-P^*|$ wherein $P_{ref}$ is a reference side lobe power generated for the reference object and P* is the power of the side lobe when the radar reception data is compensated according to the offset powers $P_2$, $P_3$ for Tx2 and Tx3.

Figure 15:
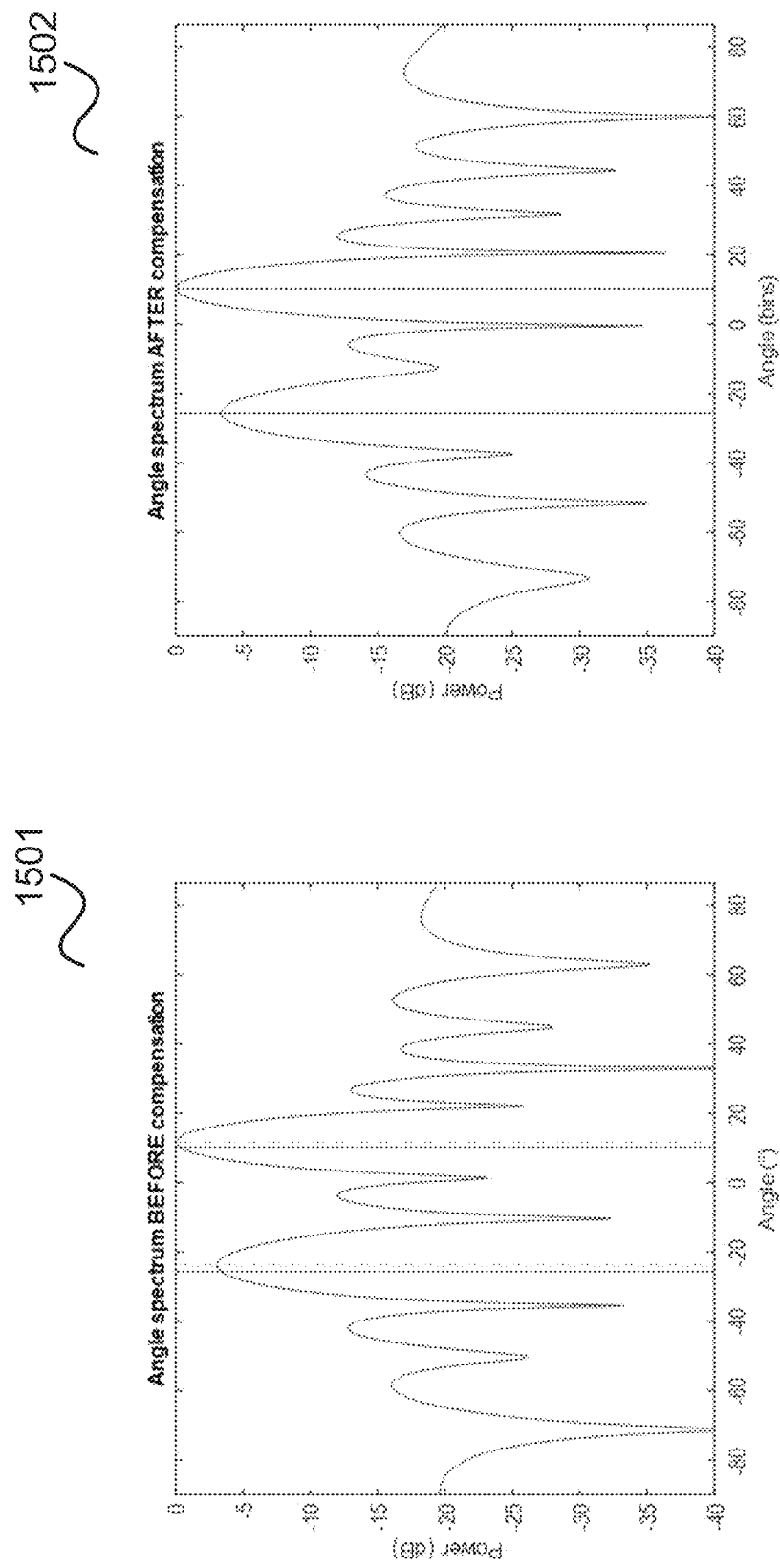
FIG. 15 shows an angle spectrum before compensation and after compensation of a phase error according to an embodiment.
Figure 17:
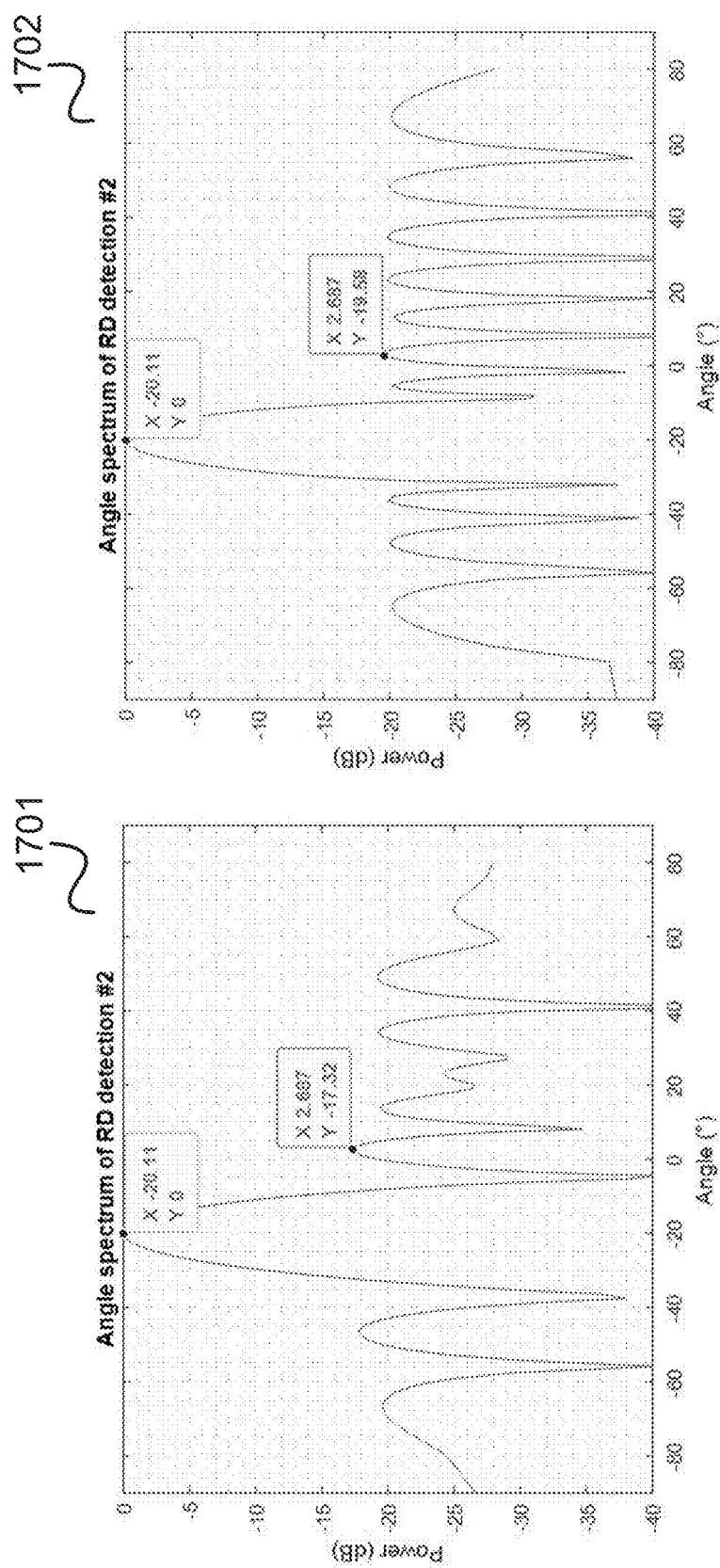
FIG. 17 shows another example of an angle spectrum before compensation and after compensation of a power error according to an embodiment.

Results of phase error and power compensations are illustrated in FIGS. 15 to 17.

FIG. 15 shows an angle spectrum before compensation 1501 and after compensation 1502 of a phase error according to an embodiment.

The spectra where generated by inserting a phase error of 10° in a transmitter of a 3Tx/4Rx MIMO radar with two targets at the same range (45 m) and at the same Doppler (4 m/s) and with respectively 10 and −25 azimuth angles. Practically, with 10° error in phase control, there would be an angular error of up to 1°.

FIG. 16 shows an angle spectrum before compensation 1601 and after compensation 1602 of a power error according to an embodiment.

The spectra where generated by inserting a 6 dB error for a transmit antenna while the other transmit antennas are set to 11 dB. As shown in 1601, the 6 dB error is inducing a reduction of side lobe by 5 dB. Practically, with 3 to 4 dB error in Tx power, there would be up to 4 dB error.

FIG. 17 shows another example of an angle spectrum before compensation 1701 and after compensation 1702 of a power error according to an embodiment.

The side lobe can be enhanced by 3 dB by correcting the 6 dB error in transmitted power on a transmit antenna while the others are also set to 11 dB.

Increasing the side lobe separation is then improving the probability of detection.

From functional safety perspective, the source for reference objects used to compute error compensations should be an independent source. For driver assistance systems and autonomous drive systems, this independent source may for example be a (geographical) high resolution map. Buildings may then for example be used as reference objects.

However, as potential source for reference objects any information source external to the radar system (for which errors should be corrected) may be used, for example a further object detection system. This includes other (physical and virtual) sensors like a camera and/or a lidar sensor and/or other radar sensors that have an overlapping field of view with the radar system or V2X (Vehicle-to-Everything) communication (or more generally a vehicular communication system) may also be used as a source of information about reference objects.

While the complexity and performance needed to run the optimization of a function can be acceptable for single or dual MMIC systems, they can become more complex for highly cascaded radar systems like using 12, 16 or even more Rx channels. For this purpose, according to one embodiment, a distribution of the various processing tasks over multiple ECUs is used. For example, a processor in a radar ECU is focused to extract the needed information to be sent to another ECU which will then be in charge to run the optimization functions.

Figure 18:
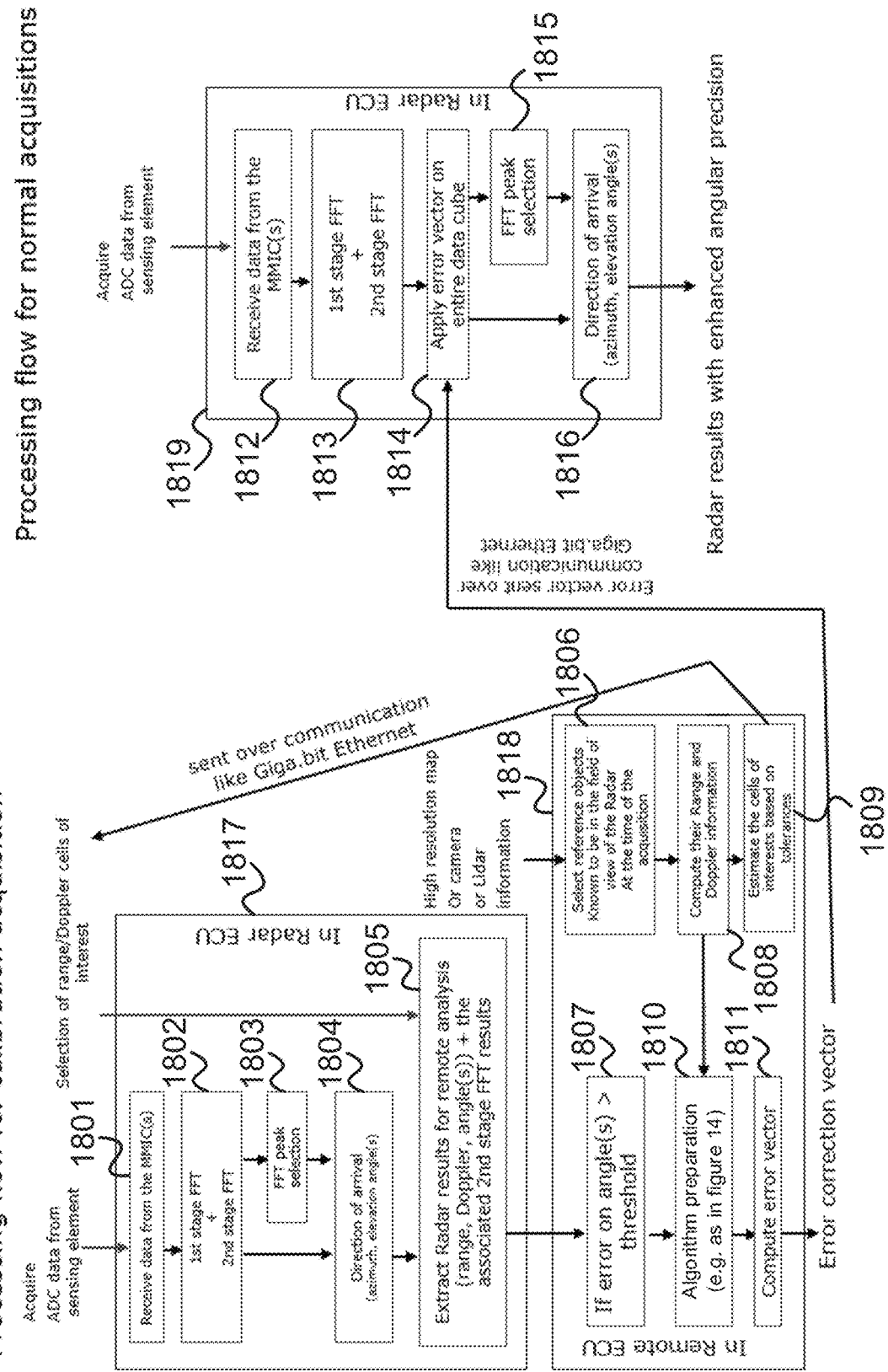
FIG. 18 shows a flow diagram illustrating an error compensation in a radar signal processing according to an embodiment, wherein the processing is distributed over multiple devices.

FIG. 18 shows a flow diagram 1800 illustrating an error compensation in a radar signal processing according to an embodiment, wherein the processing is distributed over multiple devices.

In case of a radar reception data acquisition for compensation, a first ECU 1817 (e.g. a radar ECU) performs 1801 to 1804 similar to 1201 to 1204. In 1805 it then provides data (for the detected objects) required for calculation of the compensation to a second ECU 1818 (i.e. a remote ECU of the vehicle, e.g. having higher processing power than the radar ECU).

In 1806, the second ECU 1818 selects one or more reference objects and correlates (i.e. pairs) them with the detected objects as described with reference to FIG. 12 and determines in 1807 whether the error between the reference direction and the estimated direction for any pair of detected object and reference object is above a threshold. (If that is not the case, the procedure ends.

If that is the case, an error compensation vector or value is determined in 1808 to 1811, e.g. as described with reference to FIG. 12 and/or FIG. 14.

After the compensation value has been determined, it may be applied to radar reception data acquisition for detection. This means that the first ECU 1817 or a third ECU 1819 is provided with the error compensation value (or vector). If a third ECU 1819 is provided with the error compensation value then this is an ECU having an overlapping field of view with the first ECU 1817. It obtains raw radar reception data in 1812 and generates (processed) radar reception data in 1813 by applying first stage FFT and second stage FFT and corrects the generated radar reception data in 1814. It may then perform FFT peak selection in 1815 and angular detection in 1816 using the radar reception data corrected in this manner.

The partitioning (i.e. distribution of processing tasks) as illustrated in FIG. 18 allows using the capabilities of a high-performance processor or GPU (of the second ECU 1818) to run the optimization. It should be noted that this may allow more complex approaches for calculating compensations such as using a neural network (which typically requires rather high computational performance and memory).

Error compensation and normal acquisitions may be interleaved (also for an embodiment where the processing tasks are not distributed over multiple devices). In the example of FIG. 18 this means that an error vector may be (e.g. periodically or on demand) determined using 1801-1811 and in between the error value or vector determinations objects and their directions may be detected using the flow without error value or vector determination (but using the error value or vector for compensation according to its last determination) using 1812-1816. However, determination of a compensation may also be performed with each acquisition of radar reception data (wherein an acquisition may be understood as generating one data cube).

In order to facilitate the correlation between reference objects and the detected objects (i.e. the detection list), information like radar cross section can be added to the information from reference objects. The information from reference objects can be enhanced by adding also the estimated radial speed (that is representing the Doppler measured by the radar). The correlation task can be facilitated in that the list of reference objects is not only filtered to have only the objects in the field of view of the radar system, but also includes specific tags and/or is processed by a specific additional filtering to select only the objects suitable for the correlation (compensation of azimuth angle, compensation of elevation angle).

Applying error compensation allows enhancing the accuracy of the radar system. However, from a functional safety standpoint, it can also be seen as a potential source of data corruption. Therefore, according to one embodiment, while the reference information used to compute the error compensation could come with supporting functional safety properties, a plausibility check of the computed error compensation may be performed before applying it to the (processed) data cube. The parameters for the plausibility check could come from the radar ECU itself or could also come from an external source. For example, the determined error compensation is compared with a minimum value or a maximum value or both and it is only used if it is above the minimum value, the maximum value, or both.

While the above examples have been described in context of FMCW radar, the approaches described herein may similarly be applied to PMCW (phase modulated continuous-wave) radar (in a radar device having one or more MMICs).

Figure 19:
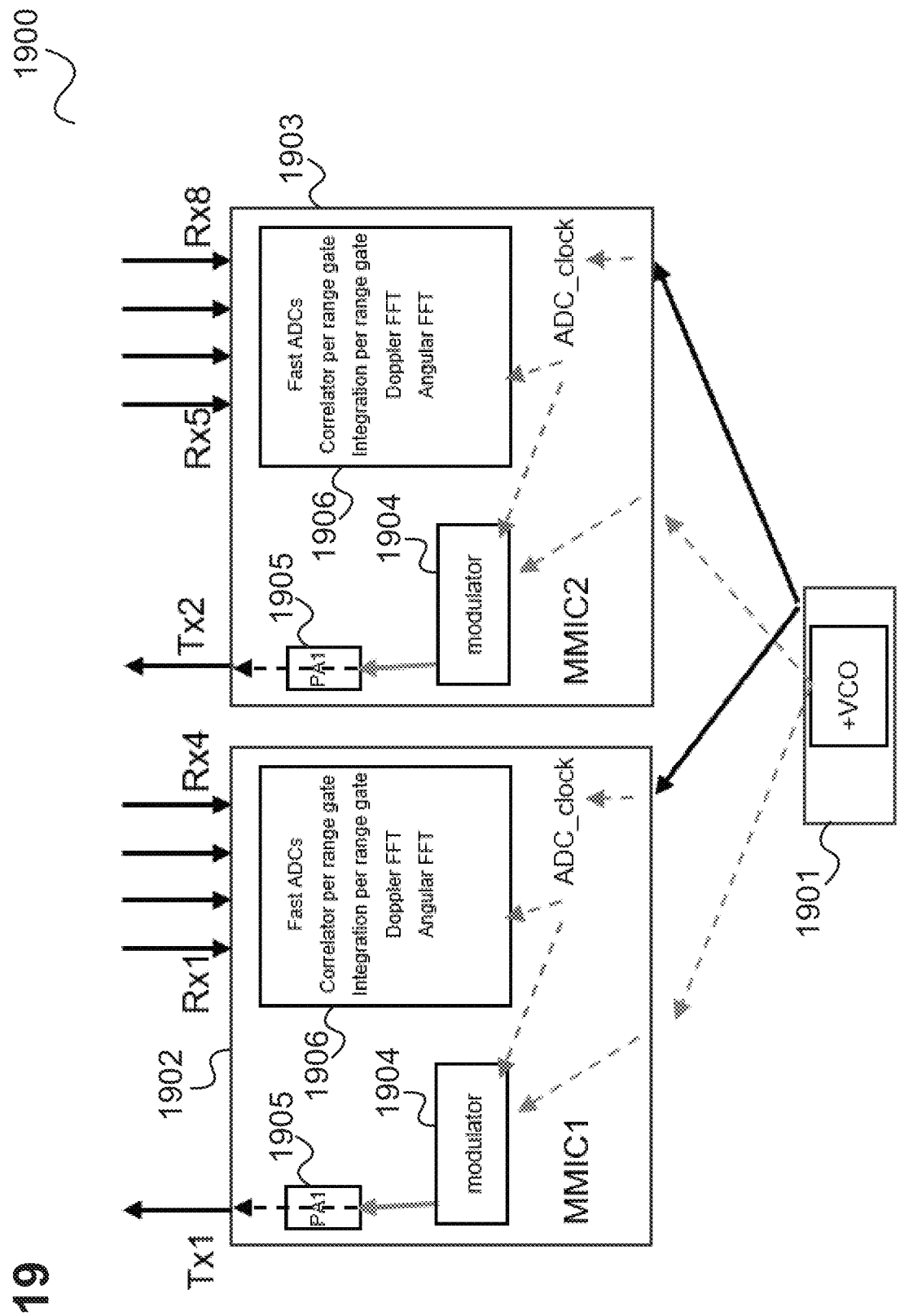
FIG. 19 shows a PMCW (Phase Modulated Continuous Wave) radar device with cascaded MMICs.

FIG. 19 shows a PMCW radar device 1900 with cascaded MMICs.

An oscillator 1901 provides oscillation signals to a first MMIC 1902 and a second MMIC 1903. Each MMIC 1902, 1903 has a transmit path (including a respective modulator 1904 and a respective amplifier 1905) and receives reception signals via multiple receive antennas. The reception signals are processed by a respective radar signal processing circuit 1906. In this example the radar signal processing circuits are shown completely within the MMICs 1902, 1903 but at least a part of them (e.g. circuits for performing FFTs) may be external to the MMICs 1902, 1903.

Although not in the very identical ways, MMICs for PMCW radar are also subjected to delay changes in its internal paths like for example phase delays between transmitters. This leads to phase differences between sample groups (after Doppler FFT) like illustrated in FIG. 9 for FMCW radar. For example, it shows that errors due to LO phase error and/or due to ADC-clock skew, lead to angular error when performing an angular computation (for example by using angular FFT). So, the above approaches may be similarly used for PMCW automotive MIMO radar.

Single chip MMIC may be designed to have well balanced phase delays between Tx channels and Rx channels. The approaches described above enable ways to design MMICs where Tx or Rx channels inside the die can be subdivided into several Rx sub-arrays and/or several Tx sub-arrays.

Figure 20:
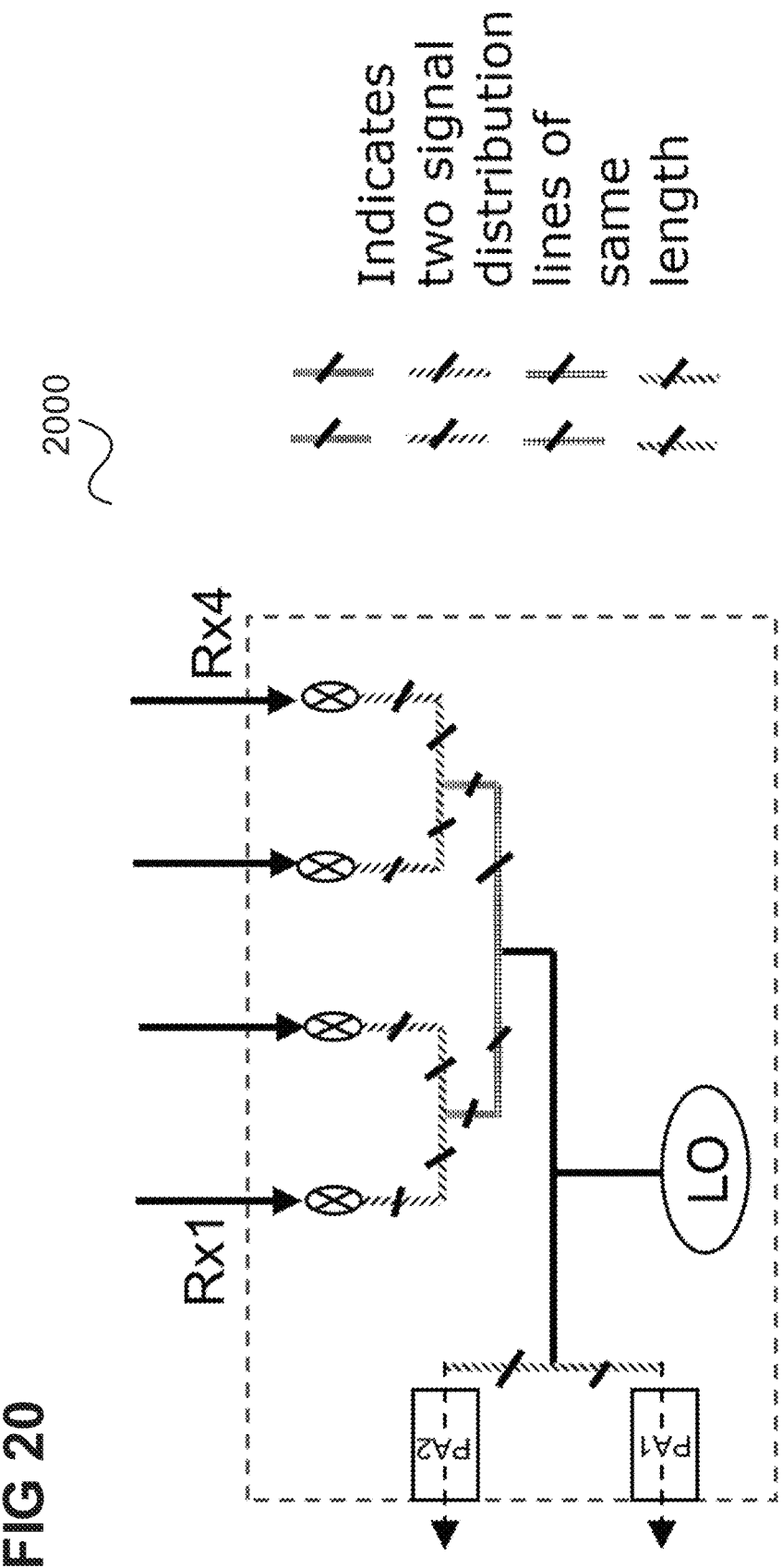
FIG. 20 shows an MMIC for FMCW Radar with a single Rx sub-array of Rx antennas.

FIG. 20 shows an MMIC 2000 for FMCW Radar with a single Rx sub-array of Rx antennas.

Figure 21:
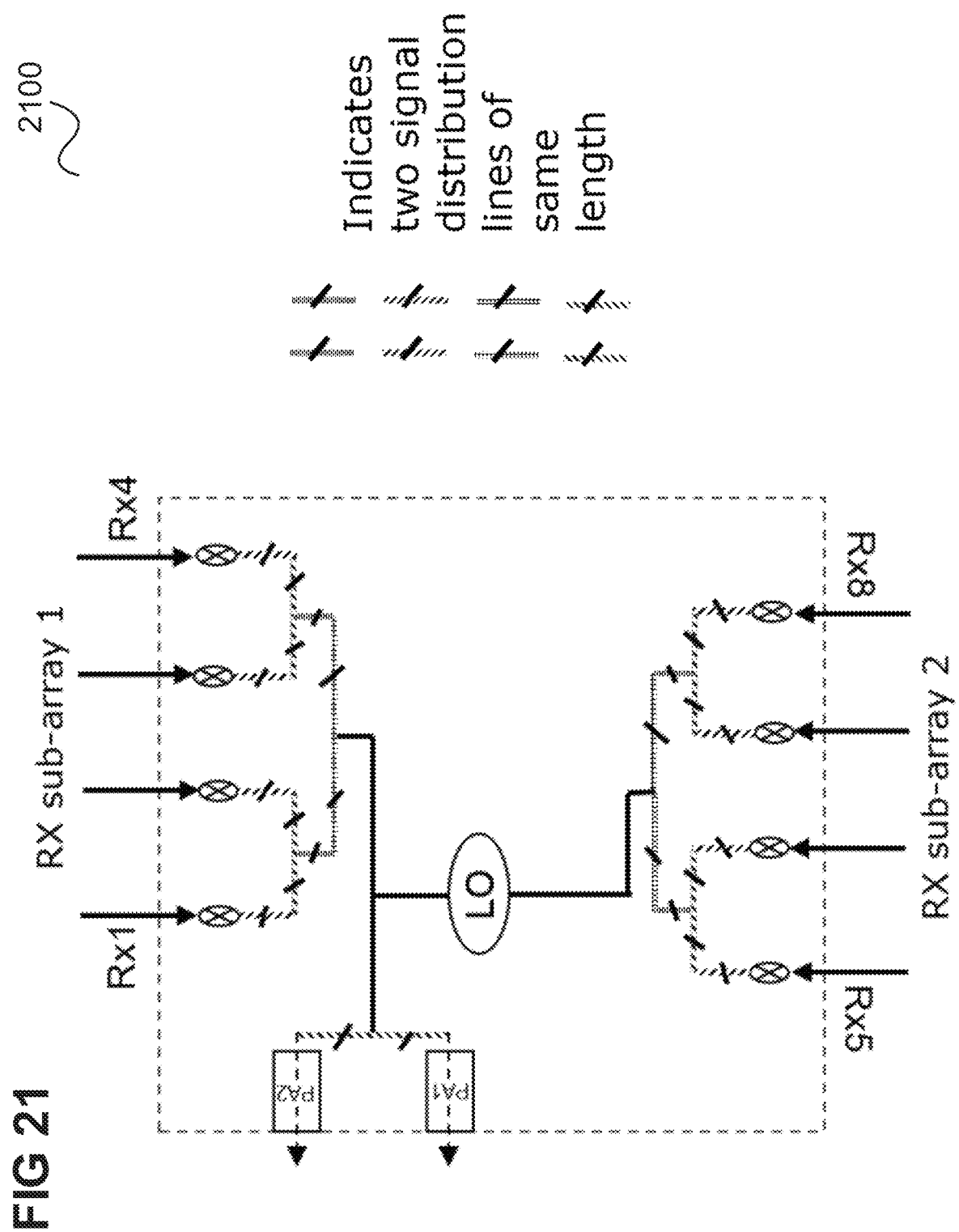
FIG. 21 shows an example of an MMIC having a layout that becomes feasible thanks to error compensation provided according to various embodiments having two Rx sub-arrays of Rx antennas.

FIG. 21 shows an example of an MMIC 2100 having a layout that becomes feasible thanks to error compensation provided according to various embodiments having two Rx sub-arrays of Rx antennas.

Because designing a single MMIC with big coherent receive array is setting complex layout constrains, the use of the error compensation as described herein allows designing an MMIC with Rx sub-arrays that will may then be recalibrated (by compensation) during the life time of the radar device containing the MMIC.

Figure 22:
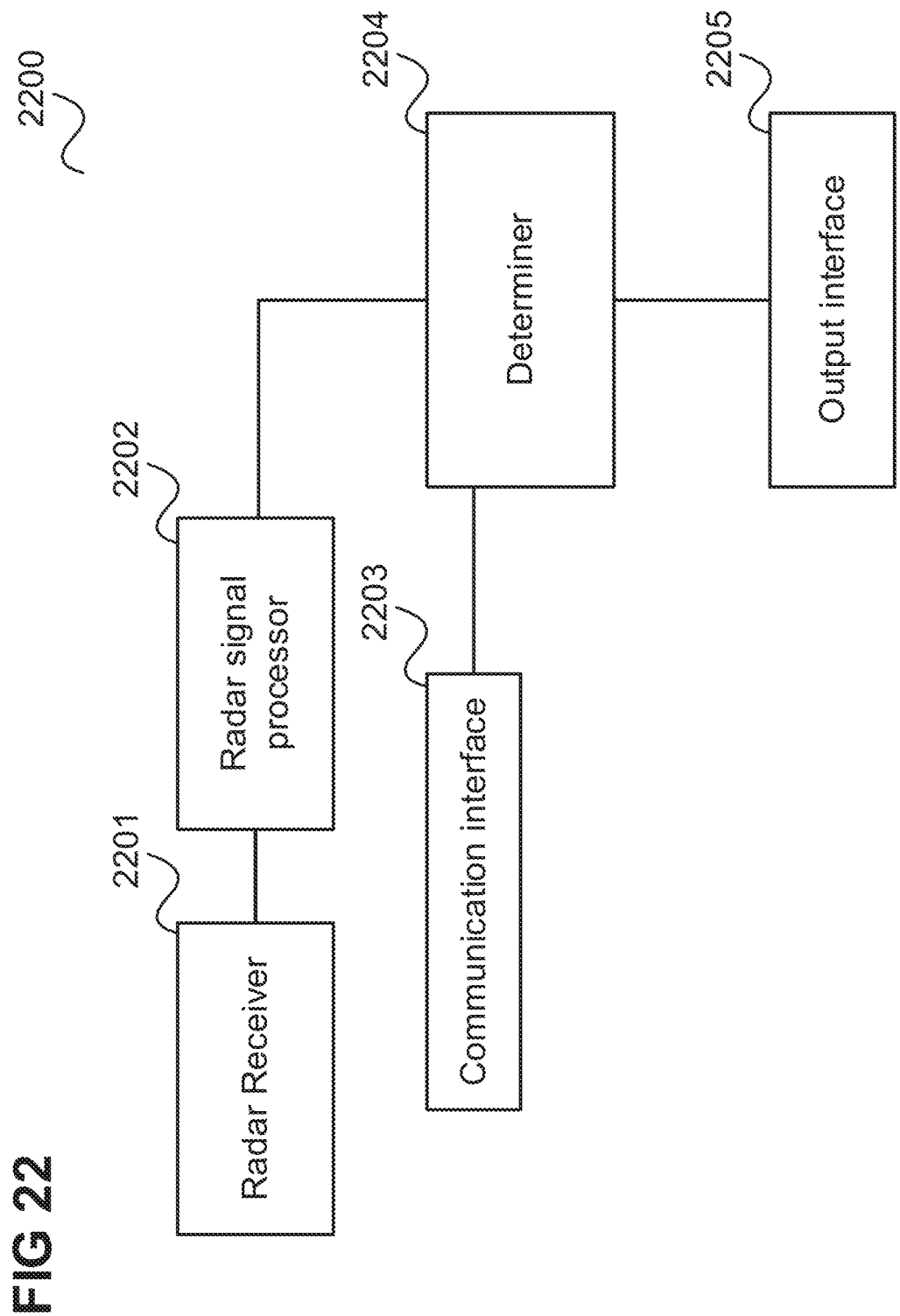
FIG. 22 shows an automotive radar arrangement according to an embodiment.

In summary, according to various embodiments, an automotive radar arrangement (e.g. a radar system of one or more radar devices mounted onto a vehicle) is provided as illustrated in FIG. 22.

FIG. 22 shows an automotive radar arrangement 2200 according to an embodiment.

The radar arrangement 2200 includes a radar receiver 2201 configured to generate radar reception data from radio signals received by a plurality of radar receive antennas and a radar signal processor 2202 configured to determine an estimate of an angular position of at least one object by processing the radar reception data.

The radar arrangement 2200 further includes a communication interface 2203 (e.g. a vehicle bus interface) configured to receive information about a reference angular position of the at least one object and a determiner 2204 configured to determine a compensation for the radar reception data depending on the estimate of the angular position of the at least one object and the reference angular position of the at least one object.

The radar signal processor 2202 is configured to correct the radar reception data and/or further radar reception data for the detection of a further object by the compensation.

The automotive radar arrangement 2200 further includes an output interface 2205 configured to provide information about the presence of the further object to a vehicle controller.

According to various embodiments, in other words, a compensation of radar reception data is determined using reference positional information of an object in the field of view of the radar arrangement (e.g. the vicinity of a vehicle containing the radar arrangement). The compensation may be selected from a set of possible compensations (i.e. a search space) such that the difference between the reference positional information (i.e. angular information) and the positional information estimated from the compensated radar reception data is as low as possible. This can be seen as a closed loop control where the compensation is set to minimize the difference between reference and estimated positional information. The compensation may include one or more error correction values, e.g. a phase offset or a power offset to be applied to values of (e.g. a part of) the radar reception data, e.g. radar reception data coming from a certain MMIC.

According to one embodiment, a vehicle may be provided including the automotive radar arrangement, the vehicle controller and one or more sources of reference information, i.e. including the information about the reference angular position of the at least one object.

The determiner may compare the determined compensation with an estimated compensation based on known drifts of components of the radar arrangement to then better diagnose the radar arrangement and support functional safety of the radar arrangement.

The components of the automotive radar arrangement may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor. A "circuit" may also be software being implemented or executed by a processor, e.g. any kind of computer program. Any other kind of implementation of the respective functions which are described herein may also be understood as a "circuit" in accordance with an alternative embodiment.

According to one embodiment, a method as illustrated in FIG. 23 is provided.

FIG. 23 shows a flow diagram 2300 illustrating a method for object detection by vehicle radar.

In 2301, radar reception data are generated from radio signals received by a plurality of radar receive antennas.

In 2302, an estimate of an angular position of at least one object by processing the radar reception data is generated.

In 2303, information about a reference angular position of the at least one object is received.

In 2304, a compensation for the radar reception data is determined depending on the estimate of the angular position of the at least one object and the reference angular position of the at least one object.

In 2305, the radar reception data and/or further radar reception data are corrected for the detection of a further object by the compensation.

In 2306, information about the presence of the further object is provided to a vehicle controller (e.g. via an output interface such as a vehicle bus interface).

Various Examples are described in the following:

Example 1 is an automotive radar arrangement as described with reference to FIG. 22.

Example 2 is the automotive radar arrangement of Example 1, wherein the radar reception data includes result data of an analog-to-digital-conversion applied to the radio signals, of a range Fast Fourier transform applied to the radio signals and/or of a Doppler Fast Fourier Transform applied to the radio signals.

Example 3 is the automotive radar arrangement of Example 1 or 2, wherein the determiner is configured to compare the estimate of the angular position of the at least one object with the reference angular position of the at least one object and determine the compensation for the radar reception data depending on the result of the comparison.

Example 4 is the automotive radar arrangement of Example 3, wherein the determiner is configured to determine the compensation for the radar reception data if the difference between the estimate of the angular position of the at least one object with the reference angular position of the at least one object is above a predetermined threshold.

Example 5 is the automotive radar arrangement of any one of Examples 1 to 4, wherein the determiner is configured to determine the compensation for the radar reception data by searching a compensation that minimizes the difference between the reference angular position of the at least one object and the angular position of the at least one object estimated from the radar reception data compensated by the compensation.

Example 6 is the automotive radar arrangement of any one of Examples 1 to 5, wherein the determiner is configured to determine the compensation by means of a neural network.

Example 7 is the automotive radar arrangement of Example 6, wherein the neural network is a neural network trained to determine a compensation using an input of a reference angular position and an estimated angular position or an input of a difference between a reference angular position and an estimated angular position.

Example 8 is the automotive radar arrangement of any one of Examples 1 to 7, wherein the compensation of the radar reception data includes a compensation of a phase error between parts of the radar reception data or a power error between parts of the radar reception data.

Example 9 is the automotive radar arrangement of any one of Examples 1 to 8, wherein the compensation of the radar reception data includes a compensation of the effect of a transmitter phase error, a receiver gain error, an oscillation signal distribution error, an analog-to-digital conversion clock skew, a power error between transmitters, and/or a receiver phase error on the radar reception data.

Example 10 is the automotive radar arrangement of any one of Examples 1 to 9, wherein the determiner is configured to determine the reference angular position of the at least one object from the information about the reference angular position of the at least one object, wherein the information about the reference angular position of the at least one object is geographical map data of a geographical map including the object, positional data of the at least one object from a further object detection system and/or positional data of the at least one object obtained by a vehicular communication system Example 11 is the automotive radar arrangement of any one of Examples 1 to 10, wherein the radio signals are frequency modulated continuous-wave radar signals, phase modulated continuous-wave radar signals or orthogonal frequency division multiplexing radar signals.

Example 12 is the automotive radar arrangement of any one of Examples 1 to 11, wherein the vehicle controller is configured to control a vehicle including the automotive radar arrangement using the information about the presence of the further object.

Example 13 is the automotive radar arrangement of any one of Examples 1 to 12, wherein the determiner is configured to regularly or on demand determine a compensation and to perform detection of one or more further objects using a determined compensation until determining a new compensation.

Example 14 is the automotive radar arrangement of any one of Examples 1 to 13, wherein the compensation of the radar reception data includes a compensation of errors between multiple components of the automotive radar arrangement and/or between multiple reception or transmission channels within a component of the automotive radar arrangement.

Example 15 is the automotive radar arrangement of Example 14, wherein the multiple components include multiple Monolithic Microwave Integrated Circuits and/or a power amplifier.

Example 16 is the automotive radar arrangement of any one of Examples 1 to 15, wherein the compensation includes multiple compensation values, wherein the determiner is configured to sequentially compute the compensation values to first compensate errors on individual component level followed by errors on multi-component level.

Example 17 is the automotive radar arrangement of any one of Examples 1 to 16, wherein the compensation includes multiple compensation values, wherein the determiner is configured to sequentially compute the compensation values to reduce different types of errors.

Example 18 is the automotive radar arrangement of Example 17, wherein the determiner is configured to compensate the radar reception data to reduce one or more types of errors including an angular error or a side lobe error.

Example 19 is the automotive radar arrangement of any one of Examples 1 to 18, including multiple devices, wherein a first device includes the radar receiver and a second device includes the determiner and the first device is configured to transmit the radar reception data to the second device.

Example 20 is the automotive radar arrangement of any one of Examples 1 to 19, wherein the communication interface is further configured to receive additional information about the at least one object and the determiner is configured to determine the compensation for the radar reception data depending on the additional information, wherein the additional information includes one or more of a radar cross section of the at least one object and a velocity of the at least one object.

Example 21 is the automotive radar arrangement of any one of Examples 1 to 20, wherein the communication interface is configured to receive, for each of a plurality of reference objects, information about a reference angular position of the reference object, the determiner is configured to pair each reference object with a detected object and to determine a compensation for the radar reception data depending on the estimate of the angular position of the detected object and the reference angular position of the reference object of all pairs.

Example 22 is the automotive radar arrangement of any one of Examples 1 to 21, wherein the determiner is configured to determine an individual compensation for each pair depending on the estimate of the angular position of the detected object and the reference angular position of the reference object of the pair and to determine the compensation by averaging over the individual compensations.

Example 23 is the automotive radar arrangement of any one of Examples 1 to 22, including a comparator configured to compare the determined compensation with a minimum value and/or a maximum value and the radar signal processor is configured to correct the radar reception data and/or further radar reception data for the detection of a further object by the compensation if the determined compensation lies above the minimum value and/or the maximum value, respectively.

Example 24 is a method for object detection by vehicle radar as described with reference to FIG. 23.

Example 25 is the method of Example 24, wherein the radar reception data includes result data of an analog-to-digital-conversion applied to the radio signals, of a range Fast Fourier transform applied to the radio signals and/or of a Doppler Fast Fourier Transform applied to the radio signals.

Example 26 is the method of Example 24 or 25, including comparing the estimate of the angular position of the at least one object with the reference angular position of the at least one object and determining the compensation for the radar reception data depending on the result of the comparison.

Example 27 is the method of Example 26, including determining the compensation for the radar reception data if the difference between the estimate of the angular position of the at least one object with the reference angular position of the at least one object is above a predetermined threshold.

Example 28 is the method of any one of Examples 24 to 27, including determining the compensation for the radar reception data by searching a compensation that minimizes the difference between the reference angular position of the at least one object and the angular position of the at least one object estimated from the radar reception data compensated by the compensation.

Example 29 is the method of any one of Examples 24 to 28, including determining the compensation by means of a neural network.

Example 30 is the method of Example 29, including training the neural network to determine a compensation using an input of a reference angular position and an estimated angular position or an input of a difference between a reference angular position and an estimated angular position.

Example 31 is the method of any one of Examples 24 to 30, wherein the compensation of the radar reception data includes a compensation of a phase error between parts of the radar reception data or a power error between parts of the radar reception data.

Example 32 is the method of any one of Examples 24 to 31, wherein the compensation of the radar reception data includes a compensation of the effect of a transmitter phase error, a receiver gain error, an oscillation signal distribution error, an analog-to-digital conversion clock skew, a power error between transmitters, and/or a receiver phase error on the radar reception data.

Example 33 is the method of any one of Examples 24 to 32, including determining the reference angular position of the at least one object from the information about the reference angular position of the at least one object, wherein the information about the reference angular position of the at least one object is geographical map data of a geographical map including the object, positional data of the at least one object from a further object detection system and/or positional data of the at least one object obtained by a vehicular communication system.

Example 34 is the method of any one of Examples 24 to 33, wherein the radio signals are frequency modulated continuous-wave radar signals, phase modulated continuous-wave radar signals or orthogonal frequency division multiplexing radar signals.

Example 35 is the method of any one of Examples 24 to 34, including controlling, by the vehicle controller, a vehicle using the information about the presence of the further object.

Example 36 is the method of any one of Examples 24 to 35, including determining regularly or on demand a compensation and performing detection of one or more further objects using a determined compensation until determining a new compensation.

Example 37 is the method of any one of Examples 24 to 36, wherein the compensation of the radar reception data includes a compensation of errors between multiple components of an automotive radar arrangement and/or between multiple reception or transmission channels within a component of the automotive radar arrangement.

Example 38 is the method of Example 37, wherein the multiple components include multiple Monolithic Microwave Integrated Circuits and/or a power amplifier.

Example 39 is the method of any one of Examples 24 to 38, wherein the compensation includes multiple compensation values, and wherein the method includes sequentially computing the compensation values to first compensate errors on individual component level followed by errors on multi-component level.

Example 40 is the method of any one of Examples 24 to 39, wherein the compensation includes multiple compensation values, and wherein the method includes sequentially computing the compensation values to reduce different types of errors.

Example 41 is the method of Example 40, including compensating the radar reception data to reduce one or more types of errors including an angular error or a side lobe error.

Example 42 is the method of any one of Examples 24 to 41, being performed by multiple devices, wherein a first device performs the generating of radar reception data and a second device performs the determining of the compensation and wherein the first device transmits the radar reception data to the second device.

Example 43 is the method of any one of Examples 24 to 42, including receiving additional information about the at least one object and determining the compensation for the radar reception data depending on the additional information, wherein the additional information includes one or more of a radar cross section of the at least one object and a velocity of the at least one object.

Example 44 is the method of any one of Examples 24 to 43, including receiving, for each of a plurality of reference objects, information about a reference angular position of the reference object, pairing each reference object with a detected object and determining a compensation for the radar reception data depending on the estimate of the angular position of the detected object and the reference angular position of the reference object of all pairs.

Example 45 is the method of any one of Examples 24 to 44, including determining an individual compensation for each pair depending on the estimate of the angular position of the detected object and the reference angular position of the reference object of the pair and determining the compensation by averaging over the individual compensations.

Example 46 is the method of any one of Examples 24 to 45, including comparing the determined compensation with a minimum value and/or a maximum value and correcting the radar reception data and/or further radar reception data for the detection of a further object by the compensation if the determined compensation lies above the minimum value and/or the maximum value, respectively.

According to a further Example, an automotive radar arrangement is provided including generating means for generating radar reception data from radio signals received by a plurality of radar receive antennas, first determining means for determining an estimate of an angular position of at least one object by processing the radar reception data, receiving means for receiving information about a reference angular position of the at least one object, second determining means for determining a compensation for the radar reception data depending on the estimate of the angular position of the at least one object and the reference angular position of the at least one object, correcting means for correcting the radar reception data and/or further radar reception data for the detection of a further object by the compensation and providing means for providing information about the presence of the further object to a vehicle controller.

Although specific embodiments have been illustrated and described herein, it will be appreciated by those of ordinary skill in the art that a variety of alternate and/or equivalent implementations may be substituted for the specific embodiments shown and described without departing from the scope of the disclosure. This application is intended to cover any adaptations or variations of the specific embodiments discussed herein. Therefore, it is intended that this disclosure be limited only by the claims and the equivalents thereof.

What is claimed is:

1. An automotive radar system, comprising:
   a radar receiver configured to generate radar reception data from radio signals received by a plurality of radar receive antennas;
   a radar signal processor configured to determine an estimate of an angular position of at least one object by processing the radar reception data;
   a communication interface configured to receive information about a reference angular position of the at least one object;
   a determiner configured to determine a compensation value for the radar reception data based on the estimate of the angular position of the at least one object and the reference angular position of the at least one object, wherein the radar signal processor is configured to correct the radar reception data and/or further radar reception data for detection of a further object based on the compensation value; and
   an output interface configured to provide information about a presence of the further object to a vehicle controller,
   wherein the compensation value comprises a plurality of compensation values, and wherein the determiner is configured to sequentially compute the plurality of compensation values to first compensate errors on an individual component level and to subsequently compensate errors on a multi-component level.

2. The automotive radar system of claim 1, wherein the radar reception data comprises result data of an analog-to-digital conversion applied to the radio signals, of a range Fast Fourier transform applied to the radio signals, and/or of a Doppler Fast Fourier Transform applied to the radio signals.

3. The automotive radar system of claim 1, wherein the determiner is configured to compare the estimate of the angular position of the at least one object with the reference angular position of the at least one object and determine the compensation value for the radar reception data based on a result of the comparison.

4. The automotive radar system of claim 3, wherein the determiner is configured to determine the compensation value for the radar reception data if a difference between the estimate of the angular position of the at least one object and the reference angular position of the at least one object is above a predetermined threshold.

5. The automotive radar system of claim 1, wherein the determiner is configured to determine the compensation value for the radar reception data by determining a compensation value that minimizes a difference between the reference angular position of the at least one object and the angular position of the at least one object that is estimated from the radar reception data that is compensated based on the compensation value.

6. The automotive radar system of claim 1, wherein the determiner is configured to determine the compensation value by means of a neural network.

7. The automotive radar system of claim 6, wherein the neural network is a neural network trained to determine the compensation value using the reference angular position and the estimate of the angular position, or using a difference between the reference angular position and the estimate of the angular position.

8. The automotive radar system of claim 1, wherein the compensation value of the radar reception data comprises a compensation value of a phase error between parts of the radar reception data or a power error between parts of the radar reception data.

9. The automotive radar system of claim 1, wherein the compensation value of the radar reception data comprises a compensation value of an effect of a transmitter phase error, a receiver gain error, an oscillation signal distribution error, an analog-to-digital conversion clock skew, a power error between transmitters, and/or a receiver phase error on the radar reception data.

10. The automotive radar system of claim 1, wherein the determiner is configured to determine the reference angular position of the at least one object from the information about the reference angular position of the at least one object, wherein the information about the reference angular position of the at least one object is geographical map data of a geographical map including the object, positional data of the at least one object from a further object detection system, and/or positional data of the at least one object obtained by a vehicular communication system.

11. The automotive radar system of claim 1, wherein the radio signals are frequency modulated continuous-wave radar signals, phase modulated continuous-wave radar signals, or orthogonal frequency division multiplexing radar signals.

12. The automotive radar system of claim 1, wherein the vehicle controller is configured to control a vehicle comprising the automotive radar system using the information about the presence of the further object.

13. The automotive radar system of claim 1, wherein the determiner is configured to regularly, or on demand, determine a compensation value and to perform detection of one or more further objects using a determined compensation value until determining a new compensation value.

14. The automotive radar system of claim 1, wherein the compensation value of the radar reception data is based on errors between multiple components of the automotive radar system and/or between multiple reception or transmission channels within a component of the automotive radar system.

15. The automotive radar system of claim 1, wherein the compensation value of the radar reception data is based on errors between multiple components of the automotive radar system, and wherein the multiple components include multiple Monolithic Microwave Integrated Circuits and/or a power amplifier.

16. The automotive radar system of claim 1, wherein the determiner is configured to compensate the radar reception data to reduce one or more types of errors including an angular error or a side lobe error.

17. The automotive radar system of claim 1, further comprising a first device and a second device, wherein the first device comprises the radar receiver, wherein the second device comprises the determiner, and wherein the first device is configured to transmit the radar reception data to the second device.

18. A method for object detection by vehicle radar, the method comprising:
  generating radar reception data from radio signals received by a plurality of radar receive antennas;
  determining an estimate of an angular position of at least one object by processing the radar reception data;
  receiving information about a reference angular position of the at least one object;
  determining a compensation value for the radar reception data based on the estimate of the angular position of the at least one object and the reference angular position of the at least one object;
  correcting the radar reception data and/or further radar reception data for detection of a further object based on the compensation value; and
  providing information about a presence of the further object to a vehicle controller,
  wherein the compensation value comprises a plurality of compensation values, and wherein the plurality of compensation values are sequentially determined to first compensate errors on an individual component level and to subsequently compensate errors on a multi-component level.

* * * * *